United States Patent [19]
Leichner

[11] Patent Number: 5,929,444
[45] Date of Patent: Jul. 27, 1999

[54] AIMING DEVICE USING RADIATED ENERGY

[75] Inventor: Robert C. Leichner, Menlo Park, Calif.

[73] Assignee: Hewlett-Packard Company, Palo Alto, Calif.

[21] Appl. No.: 08/381,261

[22] Filed: Jan. 31, 1995

[51] Int. Cl.[6] .................................. G01J 5/00; G01S 5/16
[52] U.S. Cl. ...................... 250/341.7; 250/340; 250/342
[58] Field of Search ................................ 250/341.7, 342, 250/340

[56] References Cited

U.S. PATENT DOCUMENTS

| | | | |
|---|---|---|---|
| 3,706,493 | 12/1972 | Redmann | 356/4 |
| 3,877,816 | 4/1975 | Weiss | 356/138 |
| 3,932,039 | 1/1976 | Frey | 356/138 |
| 4,123,165 | 10/1978 | Brown et al. | 356/152 |
| 4,553,943 | 11/1985 | Ahola et al. | 434/22 |
| 4,576,481 | 3/1986 | Hansen | 356/375 |
| 4,606,724 | 8/1986 | Chanforan | 434/20 |
| 4,626,892 | 12/1986 | Northrup et al. | 358/21 |
| 4,639,222 | 1/1987 | Vishlizky | 434/20 |
| 4,958,072 | 9/1990 | Hofler et al. | 250/231 |
| 5,045,843 | 9/1991 | Hansen | 340/709 |
| 5,091,648 | 2/1992 | Owers et al. | 250/342 |
| 5,137,353 | 8/1992 | Seegmiller | 356/152 |
| 5,215,465 | 6/1993 | Marshall et al. | 434/22 |
| 5,227,985 | 7/1993 | DeMethon | 364/559 |
| 5,230,505 | 7/1993 | Paquet et al. | 273/26 |
| 5,248,150 | 9/1993 | Koma | 273/313 |
| 5,268,734 | 12/1993 | Parker et al. | 356/152 |
| 5,299,971 | 4/1994 | Hart | 446/484 |
| 5,339,095 | 8/1994 | Redford | 345/158 |
| 5,631,654 | 5/1997 | Karr | 342/107 |

OTHER PUBLICATIONS

Brian O. Kelly and Robert I. Nemhauser, "Techniques for Using the Position Sensitivity of Silicon Photodetectors to Provide Remote Machine Control," 21st Annual IEEE Machine Tool Conference, Hartford, Connecticut, Oct. 29–31, 1973.

Erhard Feige et al., A New Optical Transducer to Measure Dampened Harmonic Motion, Am. J. Phys. vol. 51, No. Oct. 10, 1983.

(List continued on next page.)

Primary Examiner—Constantine Hannaher

[57] ABSTRACT

An aiming device (or method) which monitors rotational and angular displacement changes with high precision. The detected changes in rotation and/or angular displacement are then used in various operations depending on the implementation. The invention is useful for many different implementations, including a pointing device, a remote control device, and a shooting practice system. Regardless of implementation, the invention utilizes one or more emitters which emit modulated energy signals, and a detector which detects the emitted energy signals. The detected energy signals are processed by a processing unit to determine a point of aim (angular displacement) and a rotation of a detector with respect to the one or more emitters. As a remote control device, the invention enables a user to invoke actions by pointing and rotation of the remote control device. As a shooting practice system, the invention predicts shot placement on a target with high accuracy, while supporting both "live" fire and "dry" fire.

13 Claims, 27 Drawing Sheets

OTHER PUBLICATIONS

William Light, "Non–Contact Optical Position Sensing Using Silicon Photodectectors," United Detector Technology, Hawthorne, California Apr. 1982.

Brahm Bhardwaj, Silicon Photodiodes—Physics and Technology, United Detector Technology, Hawthorne, California, Apr. 1982.

Robert H. Hamstra, Jr. and Paul Wendland, Noise and Frequency Response of Silicon Photodiodes Operational Amplifier Combination, Applied Optics, vol. 11, No. 7, Jul. 1972, pp. 1539–1547.

Paul H. Wendland, "Measuring LED Outputs Accurately," Electro–Optical Systems Design, Nov. 1971, pp. 24–27.

L. D. Hutcheson, "Practical Electro–Optic Deflection Measurements System," Optical Engineering, vol. 15, No., 1, Jan.–Feb. 1976, pp. 61–63.

Ian Edwards, "Using Photodetectors for Position Sensing," SENSORS, Dec. 1988.

Felix J. Schuda, "High–Precision, Wide–Range, Dual–Axis, Angle Monitoring System," Rev. Sci. Instrum. 54(12), Dec. 1983, pp. 1648–1652.

"Simulator fur die Schiebausbildung in Vereinen", Waffentechnik–Joniskeit, Germany, Jan. 1994.

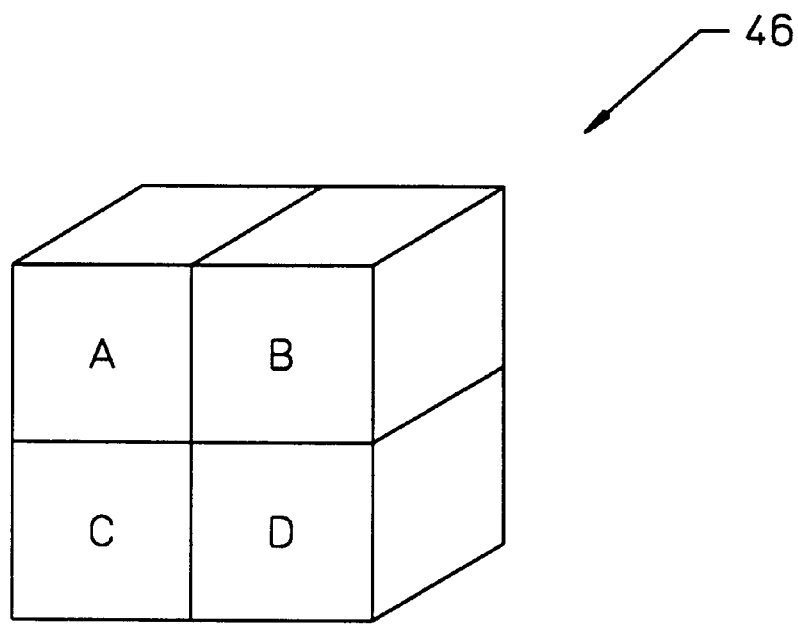
FIG. 6
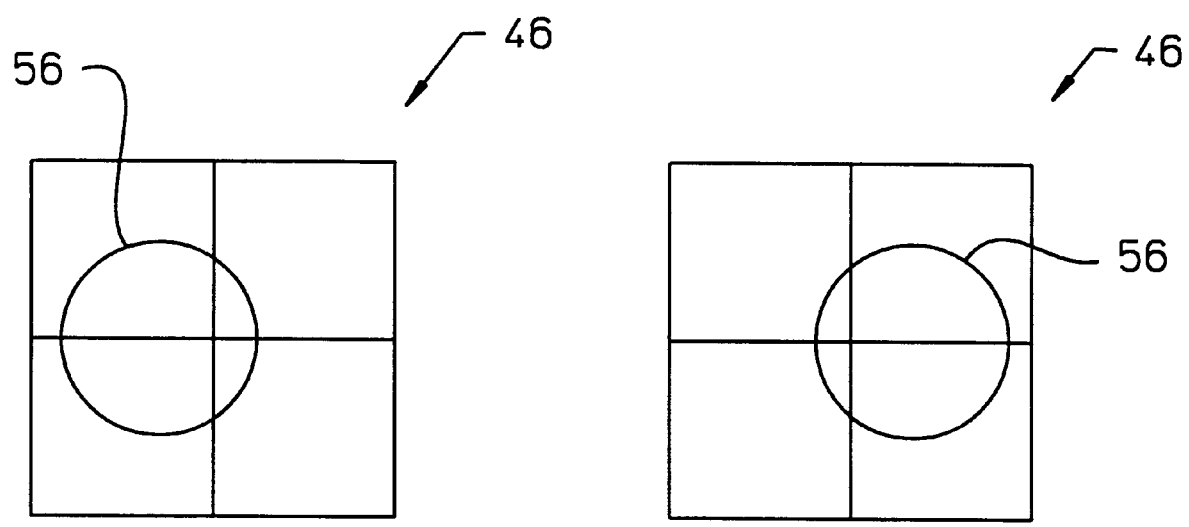
FIG. 7A  FIG. 7B

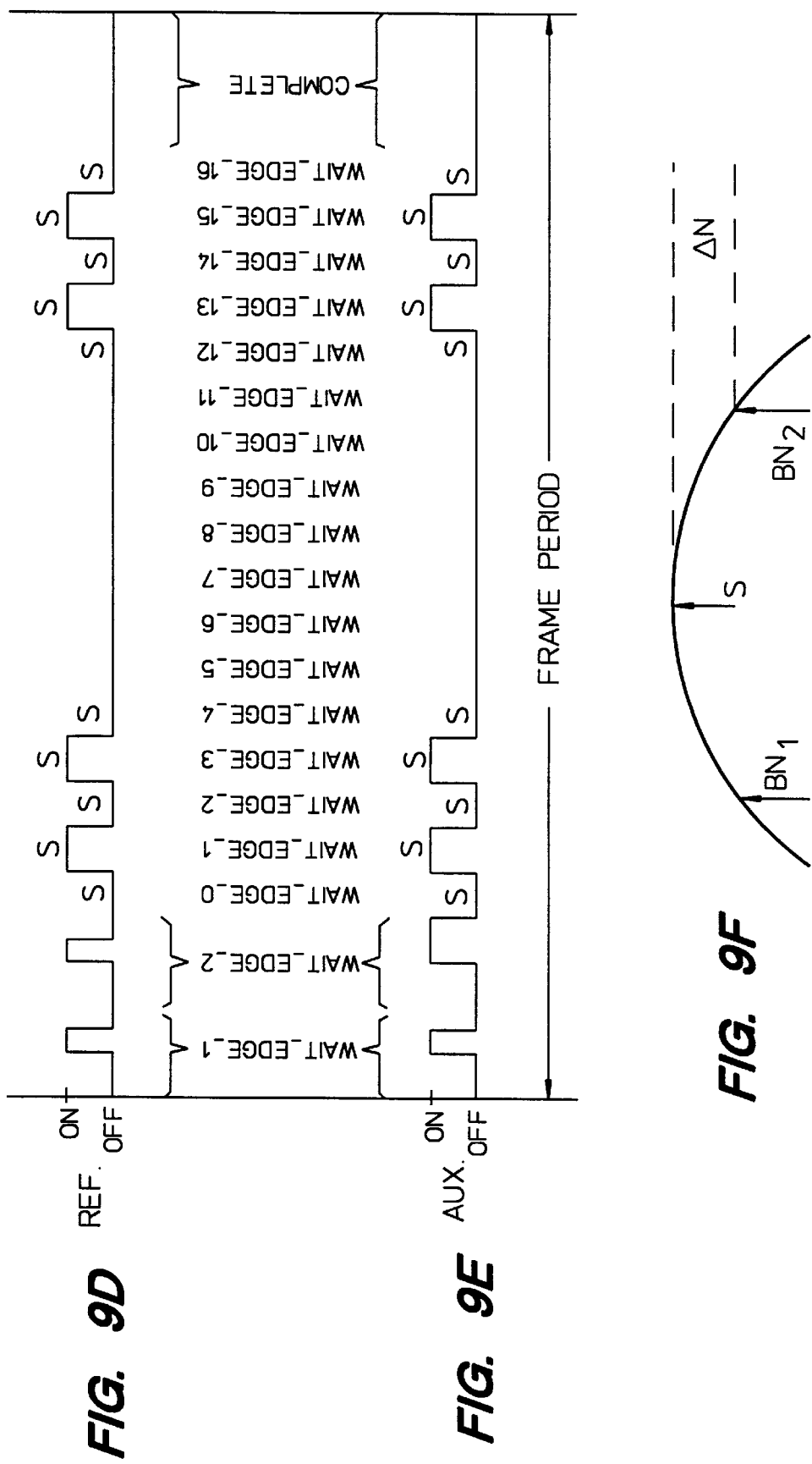

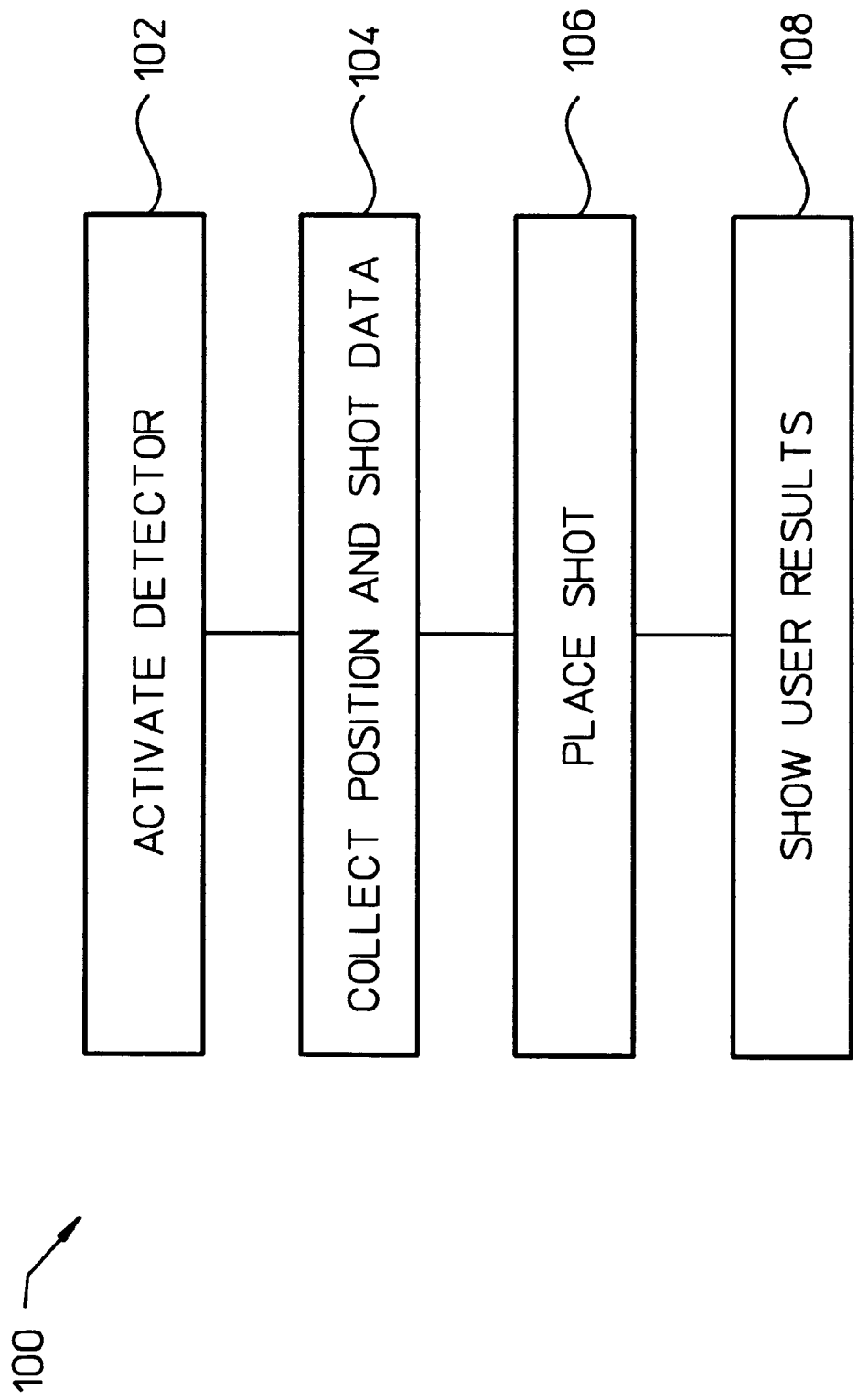

AIMING DEVICE USING RADIATED ENERGY

BACKGROUND OF THE INVENTION

1. Field of the Invention

The present invention relates to aiming devices and, more particularly, to a method and system for sensing point of aim and rotation using optical energy.

2. Description of the Related Art

In general, aiming or pointing devices have been used in numerous different applications. Laser pointing devices, for example, are commonly used for gun sights or for "play" guns which are used with arcade games. Mechanical pointing devices (e.g., mouse) are also very popular. These known pointing devices are general purpose devices which are not capable of providing high precision aiming feedback for guns or other shooting apparatus.

Pointing devices which use radiated energy to communicate from a remote unit to a base unit are known. These known pointing devices are, however, unsatisfactory because they are not true three-axis pointing devices. U.S. Pat. No. 5,339,095, issued to Redford, describes a pointing device useful to control a computer system. The device is only a two-axis system which measures tilts left, right, up and down. A fundamental problem with this device is that the natural motion for a user of a pointing device is pointing, not tilting. U.S. Pat. No. 5,045,843, issued to Hansen, describes an optical pointing device used to provide cursor control on a display screen. This device is a two-axis system capable of measuring either tilts or translation of a camera with respect to a light source. Known pointing devices are unable to provide three-axis information; therefore, the uses of existing pointing devices are limited and not as flexible as users would like.

One particular application of an aiming device is a shooting practice apparatus. Shooting practice for various shooting apparatus, such as guns and bows, has become more popular in recent years, particularly when training for competitive shooting. Several aiming or pointing devices are or have been specifically made for shooting practice. U.S. Pat. No. 4,553,943, issued to Ahola et al, is an example of one such device. Ahola et al describes a method for shooting a narrow light beam at a target. A laser attached to the gun shines its beam of light towards the target. The target is made of glass and has a spot sensitive light detector directly behind it. The device determines where the shot would land on the target by the position where the light-spot lands on the target. Because bullets are not used, a shooter is able to practice his technique indoors. The method also makes use of continuous sensing so that it is possible to follow the aim of the gun during aiming and discharging.

The overall problem with existing shooting practice devices is that they do not provide satisfactory precision for those seeking to use the aiming device as a sports training aid. For the serious shooter who shoots at targets, high precision aiming and shot placement is desired so that he/she can analyze his/her shooting technique for flaws and thereby improve their technique. This demands that the aiming device provide high precision results. By high precision, it is meant accuracy of less than about 1 millimeter, preferably less than 0.1 millimeter at a range of 10 meters. Existing aiming devices, however, have been unable to satisfy the precision needs of serious shooters. Thus, there is a need for an aiming device which can reliably report high precision information to the shooter. This high precision information would include not only information about the shooters' aiming but also information as to where the shot would hit the target if actually shot.

A major reason why existing shooting practice devices cannot provide satisfactory precision for the serious shooter is that the existing shooting training devices are incapable of measuring and utilizing cant in computation of shot placement or as a source of feedback and analysis for the shooter. Cant, the rotation of a shooting apparatus about the line of fire, has significant impact on shooting accuracy and as such is an important component of shooting technique.

It is also advantageous that the aiming device be partially wireless. A wireless remote control is highly desirable in application areas such as television or computer control. As for shooting practice apparatus, the ability to provide mobile setup which avoids having to electrically wire to the shooting apparatus to a target is important because such wiring would be burdensome in most cases. For example, when using an aiming device to track one's aim onto a shooter's target lodged say 25 meters away, having to run 25 meters of wire from the shooting apparatus to the target would be burdensome.

For the shooting practice apparatus, it is also important that the shooting device be suitable for both "live" fire and "dry" fire. Some existing aiming devices for shooting do not support both "live" fire and "dry" fire. The ability to support both "live" fire and "dry" fire is advantageous because shooters are able to practice at home or in other locations where "live" fire is unsafe or impractical with "dry" fire. In addition, there are advantages to "dry" fire in serious training even at sites where "live" fire is practical.

Thus, there is a need for a three-axis aiming device which can provide high precision measurements.

SUMMARY OF THE INVENTION

Broadly speaking, the invention relates to an aiming device (or method) which is able to monitor rotational changes and angular displacement changes with high precision.

The detected changes in rotation and/or angular displacement are then used in various operations depending on the implementation. The implementations are many and include a pointing device, a remote control device, a tracking device, a sports training system, a shooting simulator, a navigation aid for the blind, a machine vibrations monitor, a gun ringing characteristics monitor, time and motion studies, computer graphics, computer games, robotics, a shooting practice method, and a remote control method. For example, when the invention pertains to a remote control device, the rotational and angular displacement changes are used to invoke operations in an appliance being controlled, and when the invention pertains to a shooting practice system, the rotational and angular displacement changes are used to provide technique feedback to the shooter as well as to predict shot placement. Regardless of how the invention is embodied, the invention can be implemented as either a system, apparatus or method.

As a system, the invention includes emitters for emitting modulated energy signals in a predetermined direction, an energy detector, and a processing unit. The energy detector receives at least a portion of the modulated energy signals produced by the emitters as detected energy. The processing unit determines a point of aim of the detector with respect to at least one of the emitters based on the detected energy and determines a rotation of the detector with respect to a reference location based on the detected energy.

As a shooting practice apparatus, the invention includes a shooting apparatus for shooting or simulating the shooting of a projectile towards a target, at least one emitter disposed near the target for emitting energy in a predetermined direction, a detector coupled to the shooting apparatus and disposed during operation in the predetermined direction from the emitter, and a processing unit coupled to the detector. The detector produces a detected signal based on a location at which the emitted energy impinges an imaged spot on the detector. The processing unit then determines a point of aim of the detector with respect to the emitter using the location of the detected signal on the detector. Additionally, the processing unit may also determine a rotation amount of the detector with respect to the emitters, and a point of impact of the projectile on the target based on both the point of aim and the rotation amount.

As a method for controlling interaction between a remote device and a reference device, the invention includes the operations of transmitting energy between the remote device and the reference device, determining a rotational position of the remote detector with respect to the reference device, monitoring changes in the rotational position of the remote detector with respect to the reference device, and controlling interaction between the remote device and the reference device based on the changes in the rotational position. The rotational position of the energy detector being about an axis between the reference device and the remote device. The controlled interaction includes the remote device controlling the reference device by changing at least one of the angular displacement and the rotational position. The controlled interaction also includes the remote device directing an object on the reference device. Additionally, the method may include such operations as determining an angular displacement of the remote device with respect to the reference device, and controlling interaction between the remote device and the reference device based on the changes in the angular position.

The invention has numerous advantages, some of which are now mentioned. In the case of the remote control device, the ability to control dials or other devices using rotational movement represents a significant improvement over the prior art. In the case of the shooting practice system, the invention reliably obtains high precision results which have heretofore been unattainable. For the serious shooter who shoots at targets, the high precision aiming and shot placement provided by the invention supports both "live" fire and "dry" fire and enables the shooter to analyze his/her shooting technique with a high degree of precision. The invention is also advantageous because the controlled device or target device need not be electrically wired to the remote control device or the shooting apparatus. The invention is able to obtain high precision results, yet requires only inexpensive components.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6 is a schematic diagram of a quad detector;

FIGS. 7A and 7B are diagrams illustrating an example of an imaged spot as it appears on the quad detector shown in FIG. 6;

FIGS. 9D and 9E are waveform traces for a modulation approach according to the invention;

FIG. 9F is a diagram illustrating sampling of received signals during a peak of a background noise signal;

FIG. 11A is a flowchart of the overall operations performed by a shooting practice method according to the invention;

DETAILED DESCRIPTION OF THE INVENTION

Embodiments of the invention are discussed below with reference to FIGS. 1–20. However, those skilled in the art will readily appreciate that the detailed description given herein with respect to these figures is for explanatory purposes as the invention extends beyond these limited embodiments.

The invention pertains to a high precision aiming device or method which can be implemented in numerous ways. For example, the invention can be implemented as a pointing device, a remote control device, a tracking device, a sports training system, a shooting simulator, a navigation aid for the blind, a machine vibrations monitor, a gun ringing characteristics monitor, time and motion studies, computer graphics, computer games, robotics, a shooting practice method, and a remote control method.

The embodiments of the invention described in detail below relate to either a remote control device or a shooting practice system which are able to monitor rotational changes and angular displacement changes with high precision. The detected changes in rotation and/or angular displacement are then used in various operations depending on the implementation. For example, when the invention pertains to a remote control device, the rotational and angular displacement changes are used to invoke operations in an appliance being controlled. When the invention pertains to a shooting practice system, the rotational and angular displacement changes are used to provide technique feedback to the shooter as well as to predict shot placement.

Regardless of implementation, the invention utilizes one or more emitters which emit modulated energy signals, and a detector which detects the emitted energy signals. The detected energy signals are processed by a processing unit to determine a point of aim (angular displacement) and a rotation of a detector with respect to the one or more emitters. The determination of the rotation of the detector with respect to the emitters is particularly novel.

Figure 1:
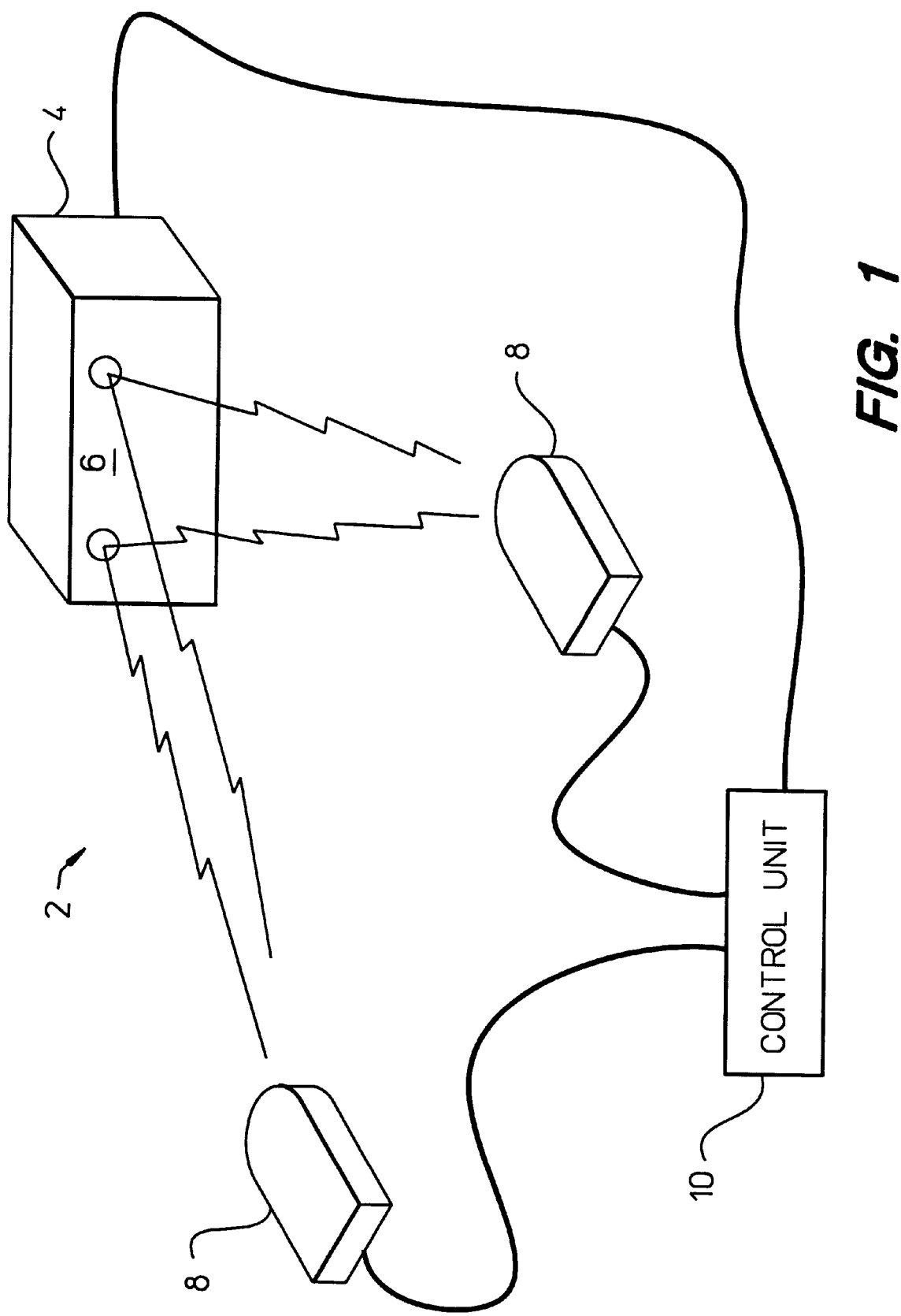
FIG. 1 illustrates an embodiment of a remote system according to the invention.

FIG. 1 illustrates an embodiment of a remote control system according to the invention. The system 2 includes a reference device 4 having emitters 6 positioned thereon or proximate thereto, remote devices 8, and a control unit 10. The reference device 4 is typically either an inactive reference device (e.g., a shooting target) or an active reference device (e.g., television, video cassette recorder and numerous other information appliances). The emitters 6 emit modulated energy signals. Preferably, the energy signals are infrared light signals. The emitted energy signals are received and sampled by the remote devices 8 which operate as detectors of the energy signals. The remote devices 8 then provide the sampled data to the control unit 10. Using the sampled data, the control unit 10 determines the point of aim and/or rotation of the remote device 8 relative to the reference device 4.

In the case where the reference device 4 is an information appliance, the control unit 10 can then inform the information appliance as to the actions desired by the user of the remote device 8. Here, the reference device 4 is referred to as a controlled device because it is being controlled by the user via the remote device 8. For example, if a user wishes to move a graphical pointing indicator on a display screen of a television operating as the information appliance, the user simply points the remote device 8 to a desired position on the display screen so that a graphical pointing indicator appearing on the display screen of the television can be positioned as the user desires. By making use of the signal strength of the received signals, a rough estimate of distance is available and useful to scale sensitivity of the pointing indicator with distance. As the user moves the pointing indicator in this manner, the control unit 10 informs the controlled device 4 as to the movement of the pointing indicator on the display screen based on signals received from the remote device 8. The remote device 8 is able to provide the control unit 10 with signals which enable the control unit 10 to determine the point of aim of the remote device 8 with respect to the emitters 6 on the controlled device 4. Using the determined point of aim, the control unit 10 can then precisely determine where the remote device 8 is pointed to on the controlled device (e.g., television screen).

An important feature of the invention is that the control unit 10 is able to determine not only the point of aim but also the cant or rotation of the remote device 8 with respect to the reference device 4. The ability to detect cant or rotation is very useful and applicable to numerous implementations. As an example, cant or rotation is particularly useful for a remote device 8 when a user seeks to control dials appearing on a display screen because the invention allows the user to rotate the remote device 8 (pointed at a control dial) to induce a turning or rotation of the dial pointed to by the user. Another example is where the reference device 4 is a shooting target of a shooting practice system. Here, the rotational movement by the user (shooter) of the remote device 8 (here a shooting apparatus) during aiming and shooting is detected or tracked. The shooting practice system then uses the detected rotational movement of the shooter to determine a point of impact on a target (virtual or real) with high accuracy.

A major problem of existing shooting practice systems is their failure to recognize that rotational movement has a significant impact on system accuracy and their complete lack of capabilities to compensate for rotational movement. Consequently, existing shooting practice systems are unable to determine the point of impact with sufficient accuracy.

Although FIG. 1 shows the control unit 10 being physically wired between the reference device 4 and the remote devices 8, wires are not necessary. Instead, other communication methods may be utilized (e.g., light, radio). Further, the control unit 10 need not be a separate structure, that is, the control unit 10 can be incorporated into either the remote devices 8 or the reference device 4.

In FIG. 1, the reference device 4 has the emitters 6 positioned thereon or proximate thereto and the remote devices 8 include energy detectors for the detection of the modulated energy signals (emitted radiation) transmitted by the emitters 6. Alternatively, the emitters 6 could be placed within the remote devices 8 and the energy detector could be placed within or proximate to the reference device 4. The arrangement shown in FIG. 1 is preferred because it allows the user to use a natural pointing style of interaction. The alternative arrangement would be better suited for a tracking application than a pointing application. Further, the arrangement in FIG. 1 can yield greater accuracy because the emitters 6 are able to be further separated when positioned on or proximate to the reference device 4. Another alternative is to place emitters of different wavelength next to the energy detector and place reflectors with appropriate filters on the reference device 4.

The implementation in FIG. 1 concerns a remote control device. In subsequent figures, the invention is described in greater detail in the context of a sports training system or a shooting practice system. Regardless of the particular implementation, the structure, organization and operation of the invention is similar, though the sports training system or shooting simulator will likely require that the system have greater precision than needed for a remote control system. In particular, all implementations monitor, with high precision, rotational and/or angular displacement changes of a detector with respect to one or more emitters.

In the implementation of the invention pertaining to a sports training system or a shooting practice system, the invention monitors the aim of a shooting apparatus (e.g., gun, bow) with respect to a target.

Figure 2:
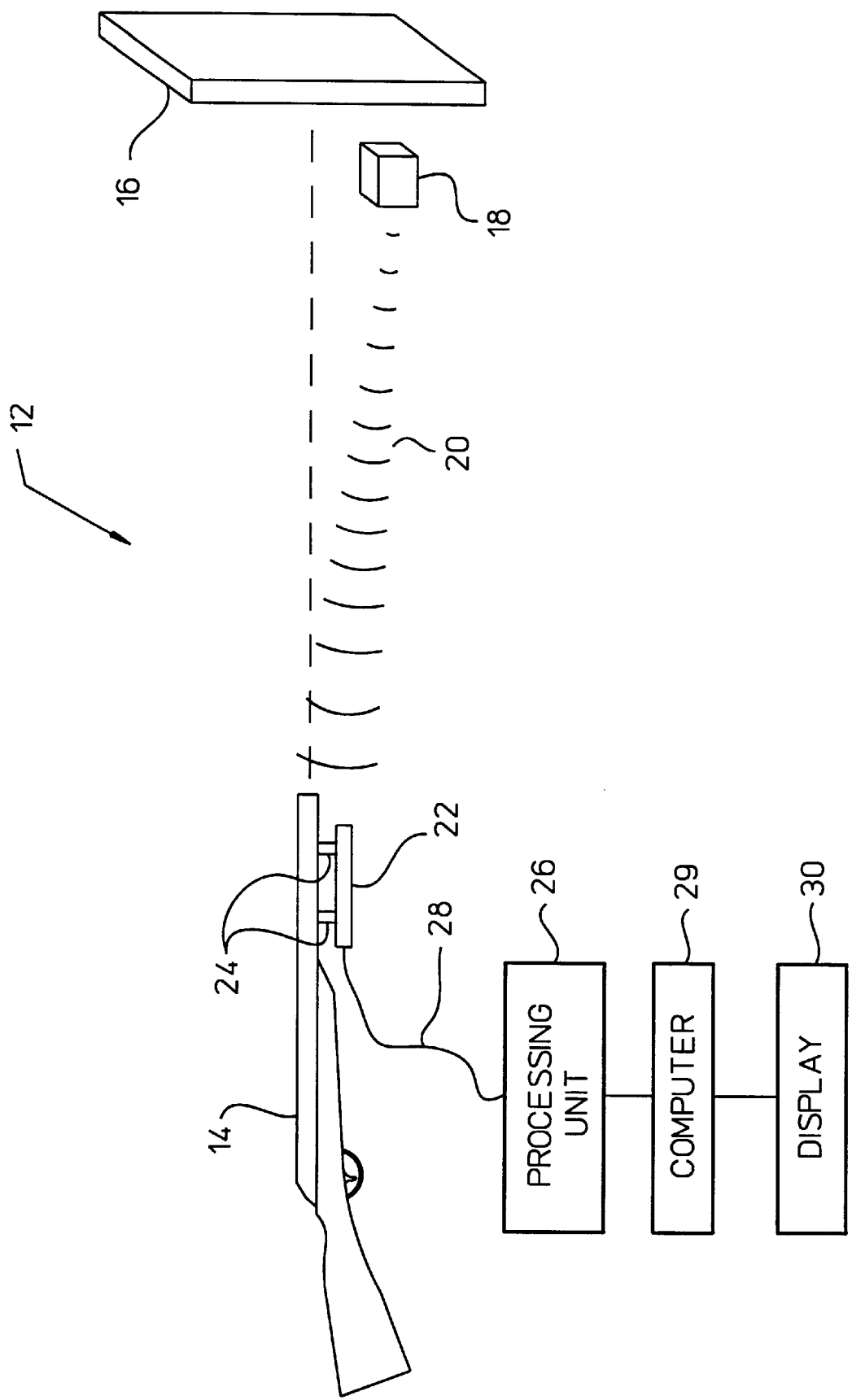
FIG. 2 is a diagram illustrating a system for shooting practice in accordance with the invention.

FIG. 2 is a diagram illustrating a system for shooting practice in accordance with the invention. The system 12 includes a shooting apparatus 14 which is directed towards a target 16. Here, the shooting apparatus 14 is the remote device 8 and the target is the reference device 4. Attached to the target 16 or proximate thereto is an emitter 18 which emits energy signals 20 towards the shooting apparatus 14. Attached to the shooting apparatus 14 is a detector assembly 22. The detector assembly 22 is mounted to the shooting apparatus 14 using attachment members 24. The attachment members allow the alignment of the detector assembly 22 with the shooting apparatus 14 to be adjusted so that the detector assembly 22 points close to the emitter 18 when the shooting apparatus 14 is pointed at the center of the target 18. The detector assembly 22 is coupled to a processing system 26 via a cable 28. The processing system 26 is coupled to a host computer 29 which is coupled to a display screen 30.

The system 12 shown in FIG. 2 operates to determine a point of aim and a rotation amount of the shooting apparatus 14 with respect to the target 16. Once the processing system 26 is calibrated, the processing system 26 and the host computer 29 are able to use the information provided by the detector assembly 22 to determine a point of aim of the shooting apparatus 14 with respect to the target 16 and where the shot is projected to land on the target 16. Although the processing tasks carried out by the system 12 are shared between the processing unit 26 and the host computer 29, a single processing device could also be used. Here, the processing unit 26 is utilized to perform tasks that require high speed processing without unexpected interruptions. The host computer 29 performs all other processing. As an example, the processing unit 26 may include a microprocessor and the host computer 29 may be a personal computer.

As will be discussed in detail below, the system 12 tracks gun movement (namely, point of aim and rotation), predicts shot placement on the target with high accuracy, and provides scoring information and other feedback to the user. The system 12 is useful for shooting games, recreational target practice, shooting simulators, and competitive training. The system 12 is also useful regardless of whether bullets are actually shot by the shooting apparatus 14 because the display screen 30 will display where the bullet would landed in both cases. When bullets are actually shot, the target 16 is the same as would customarily be used except that one or more emitters are attached 18.

Figure 3:
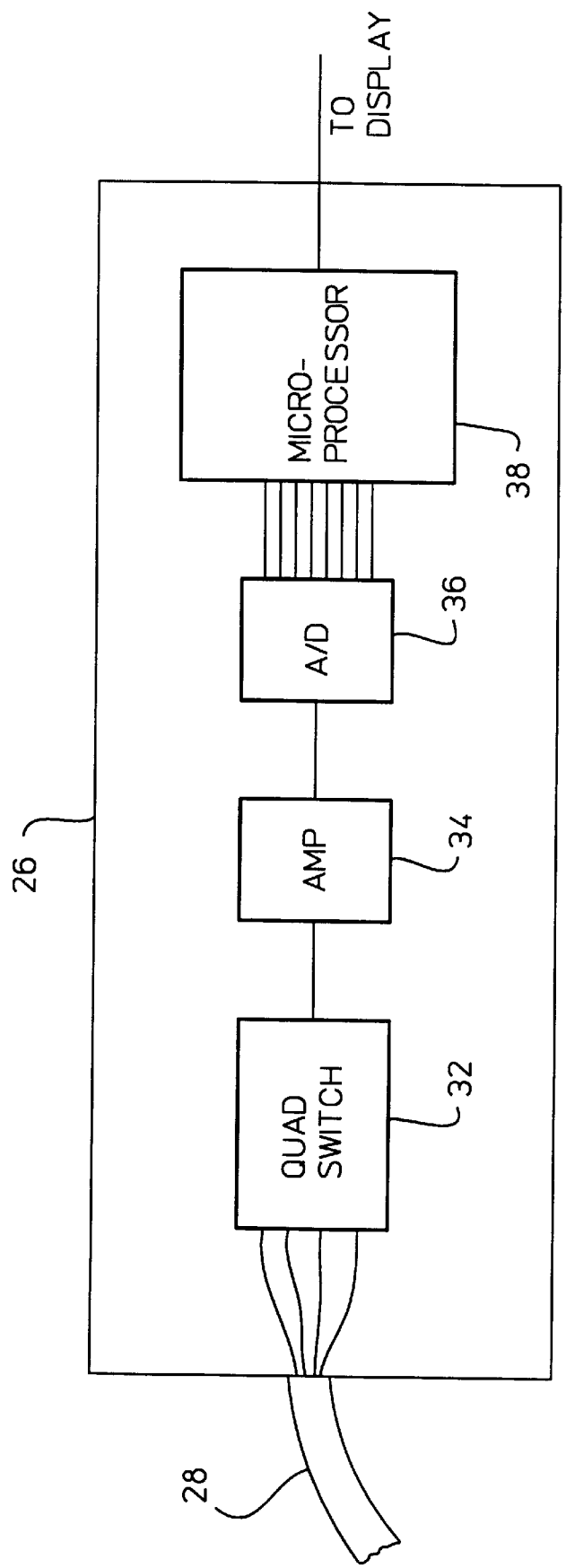
FIG. 3 is a block diagram of a computer used in the system shown in FIG. 2.

FIG. 3 is a block diagram of the processing system 26. The processing system 26 receives signals from the detector assembly 22 and supplies them to a quad switch 32. As discussed below, the detector assembly 22 outputs four quad detector channels. The quad switch 32 selects one of the four quad detector channels for processing. The selected channel is then supplied to an amplifier 34 and then to an analog-to-digital converter 36. The function of the amplifier 34 is to amplify the selected channel from the detector assembly 22 so that it is scaled properly for the analog-to-digital converter 36. The analog-to-digital converter 36 converts the selected channel to digital form for further processing by a microprocessor 38. The microprocessor 38 controls the sampling of the selected channel and certain preprocessing on the sampled data.

Although FIG. 3 shows a quad switch 32 and a single analog-to-digital converter 36, the processing system 26 can be implemented in various different ways using other known alternative circuitry. For example, instead of the quad switch 32, four sample-and-hold units or four analog-to-digital converters could be used.

The details of the functioning of the microprocessor 38 are described in detail below in conjunction with FIGS. 11B–15.

Figure 4:
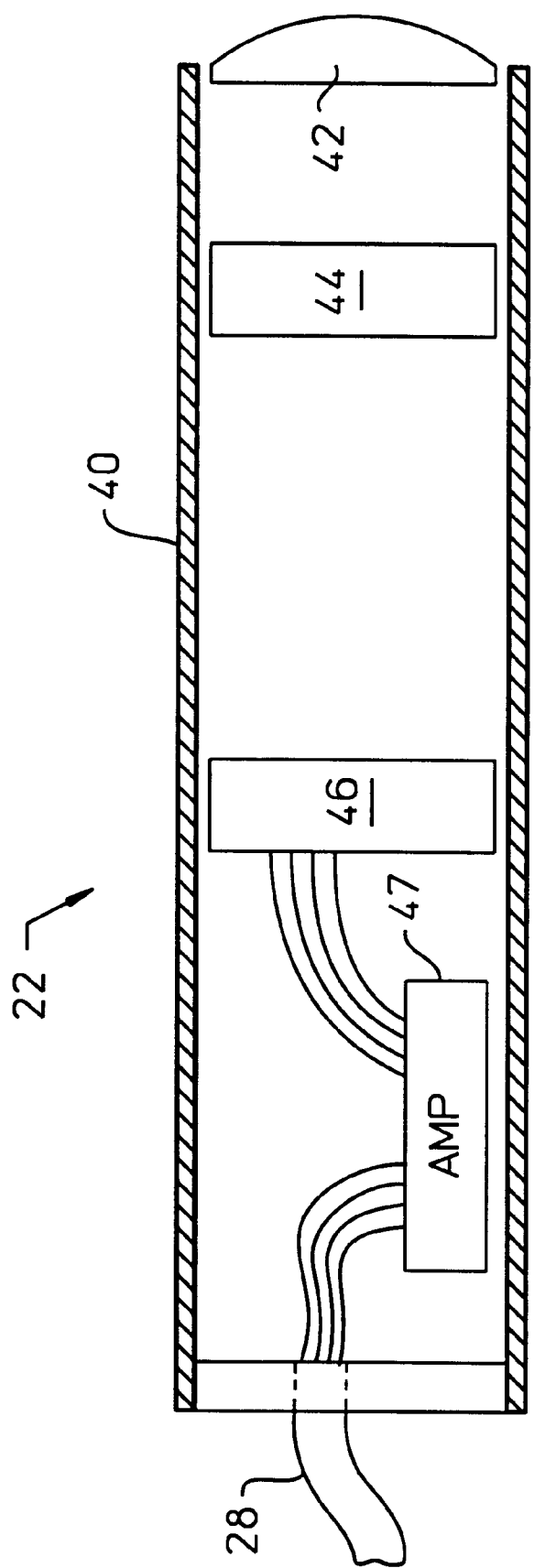
FIG. 4 is a cross-sectional diagram of a detector used in the system shown in FIG. 2.

FIG. 4 is a cross-sectional diagram of the detector assembly 22 according to the invention. The detector assembly 22 has an outer housing 40 which encloses a lens 42, a pass filter 44, a quad detector 46, and an amplifier 47. The filter 44 passes energy (e.g., light) of the type being emitted by the emitter 18 and attempts to suppress other types of energy. The quad detector 46 is a detector which has four distinct quadrants (see FIG. 6). Each quadrant of the quad detector 46 outputs a signal corresponding to the intensity of radiation falling on the particular quadrant. The focal length of the lens 42 and its distance to the detector 46 as well as the distance from the detector assembly 22 to the emitter 18 are design parameters which are used to alter the trade-off between area of coverage and resolution. A longer focal length lens will yield greater resolution but will have reduced area of coverage. Even so, whatever trade-offs are selected, the emitter image falling on the quad detector 46 should deliver energy to all four quadrants over the full range of motion to be permitted without allowing the image to pass off of any one of the quadrants of the quad detector 46. The amplifier 47 amplifies the signals produced by the quad detector 46 and then forwards them to the processing system 26 via the cable 28.

Accurate detection of a shot event is necessary to properly determine shot placement. Although the technique for determining shot placement is discussed below in conjunction with FIGS. 16 and 18–20, the detection of the shot event is discussed here because it is performed in the processing unit 26. In a preferred implementation of the shooting system 12, a small microphone (not shown) is mounted directly to the housing of the detector assembly 22. Preferably, the microphone is attached to the inside of the housing at the back of the case behind the optical region of the detector assembly 22. The microphone is closely coupled to the body of the shooting apparatus 14 because the detector case is metal and the mounting brackets 24 are also metal. Sound from the firing mechanism is coupled with high efficiency to the microphone through the gun barrel, through the brackets 24, and through the housing of the detector assembly 22. Numerous other techniques can be used to detect the shot event. For example, an accelerometer or switch (optical, electrical, mechanical, etc.) could be used.

The invention will also operate in a dry fire mode in which no actual shot (e.g., no bullet projected) takes place because the vibrations caused by the firing mechanism (e.g., the hammer striking the hammer block) provides sufficient vibration for shot detection. As a result, shooting training may take place where live fire is not appropriate. The shot detection circuitry can further avoid false triggers by using a rapid charge slow discharge filter and rectifier on the signal produced by the microphone and supplied to the microprocessor 38. Because the invention determines shot placement using information gathered prior to the recoil of the shooting apparatus 14 when used in live fire, the determination of shot placement is the same in either live or dry fire. This means that the sight picture the shooter sees when shooting in dry fire is accurately reflected in the shot placement determination. Sight picture is the picture the shooter sees when viewing the target through the sight on the shooting apparatus 14.

Figure 5:
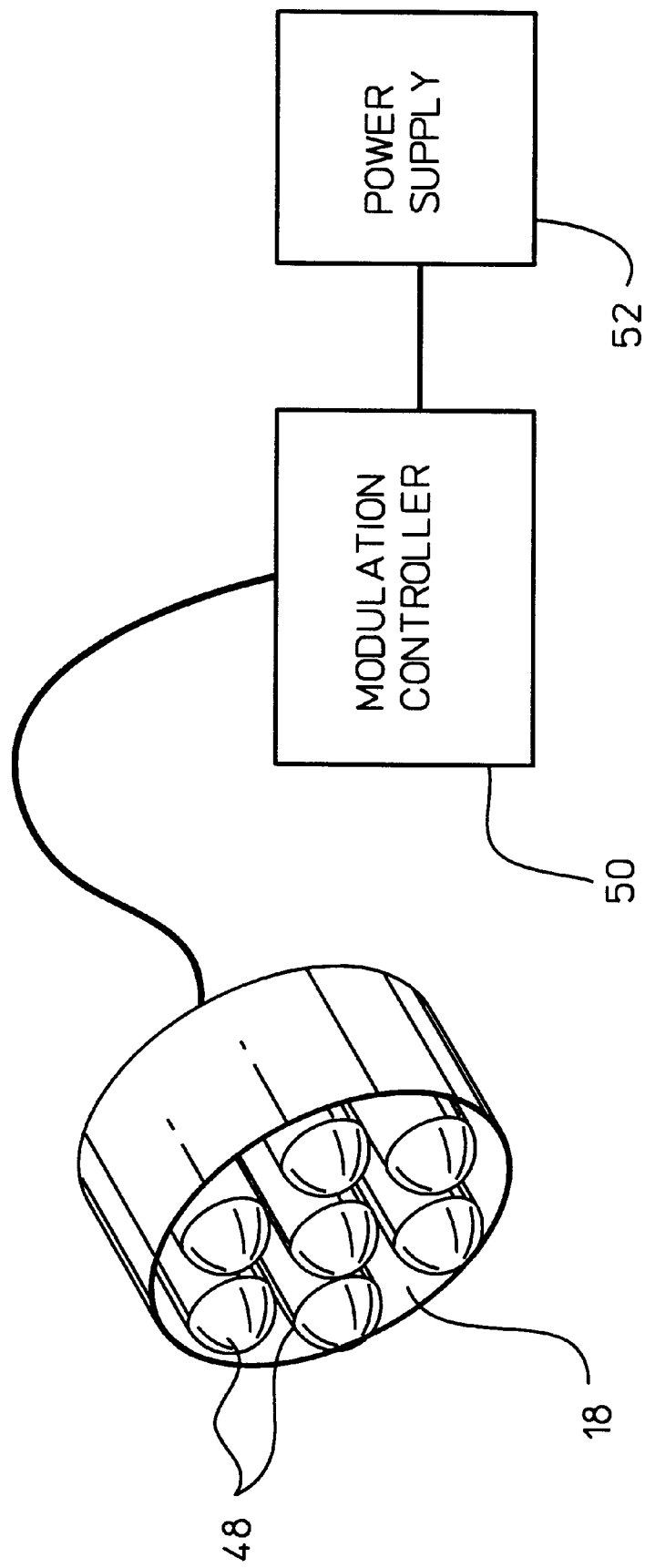
FIG. 5 is a block diagram of an emitter used in the system shown in FIG. 2.

FIG. 5 is a schematic diagram of the emitter 18. The emitter 18 is shown as comprising a plurality of individual emitters 48 closely packed together. The individual emitters 48 are, for example, Hewlett-Packard HSDL-4230 or Telefunken TSHA-6203. The emitter 18 is coupled to a modulation controller 50 which is connected to a power supply 52. The emitter 18 is pointed towards the general area in which position and rotation detection are desired. The modulation controller 50 operates to cause the emitter 18 to produce modulated energy signals. The modulation by the modulation controller 50 of the energy signals produced by the emitter is discussed in detail below with reference to FIGS. 9D and 9E.

Although the emitter 18 shown in FIG. 5 and described as including a plurality of closely packed emitters 48, using such a cluster of emitters 48 to obtain sufficient output energy may not be the best approach. One difficultly with the cluster approach is that the center of the output energy may not correspond to the center of the cluster of emitters. Hence, it may preferable to use a single, more powerful emitter, such as Opto Diode Corporation OD50L.

FIG. 6 is a schematic diagram of a quad detector 46. The quad detector 46 is shown as having quadrants A, B, C, and D. In the preferred implementation of the shooting system 12, the dimensions of the quad detector 46 are preferably 2.5 millimeters by 2.5 millimeters and each quad region is part of a Centronic CD33H-4D quad detector. Each quadrant A–D generates a voltage proportional to the energy (e.g., infrared energy) falling on the particular quadrant A–D. When the shooting apparatus 14 is pointed in the direction of the target, the emitter 18 and optics of the system 12 deliver a circular pattern or imaged spot 56 of energy produced by the emitter 18 on the detector 46 in such a manner that energy falls on all four quadrants A–D. It should be recognized that the detector need not be a quad detector and may, for example, be a dual axis linear detector which would be more expensive but simplify determination of the position of the imaged spot on the detector.

FIG. 7A illustrates an example of an imaged spot 56 as it appears on the detector 46. As the point of aim of the shooting apparatus 14, and consequently the detector assembly 22, changes relative to the emitter 18, the imaged spot 56 shown in FIG. 7A likewise moves on the detector quadrants A–D. As the imaged spot 56 moves across the quadrants of the quad detector 46, the relative energy in each quadrant changes. As an example, given an imaged spot 56 positioned on the quad detector 46 as shown in FIG. 7A, a horizontal motion would move the image spot 56 horizontally across the quad detector 46 such as illustrated in FIG. 7B.

The point of aim of the shooting apparatus 14 with respect to the emitter 18 is determined using the relative energy values falling on each of the quadrants of the quad detector 46. The coordinates u, v represent the position of the imaged spot 56 on the detector 46 (see FIG. 8A). Hence, the u and v coordinates refer to detector coordinates. Later, a transformation from u, v to x, y is used to map from the detector coordinates u, v to target coordinates x, y.

The u and v coordinates are determined by calculating the amount of energy detected in each of the halves of the detector 46. In particular, the amount of energy detected in quadrants A and B and the amount of energy detected in quadrants C and D are used to determine the vertical position of the imaged spot 56 on the detector 46. In a like fashion, the amount of energy detected in quadrants A and C and the amount of energy detected in quadrants B and D are used to determine the horizontal position of the imaged spot 56 on the detector 46. Although only the approach for determining the horizontal position is described in greater detail below, it should be recognized that a similar approach applies in determining the vertical position.

The optics of the system 12 are as such that when the detector assembly 22 is aimed at dead center of the emitter 18 and then moved such that the detector assembly 22 points above the emitter 18, the imaged spot 56 will move down towards quadrants C and D of the detector 46. Likewise, moving the aim from dead center to the right will move the imaged spot 56 to the left towards the quadrants A and C of the detector 46.

Figure 8A:
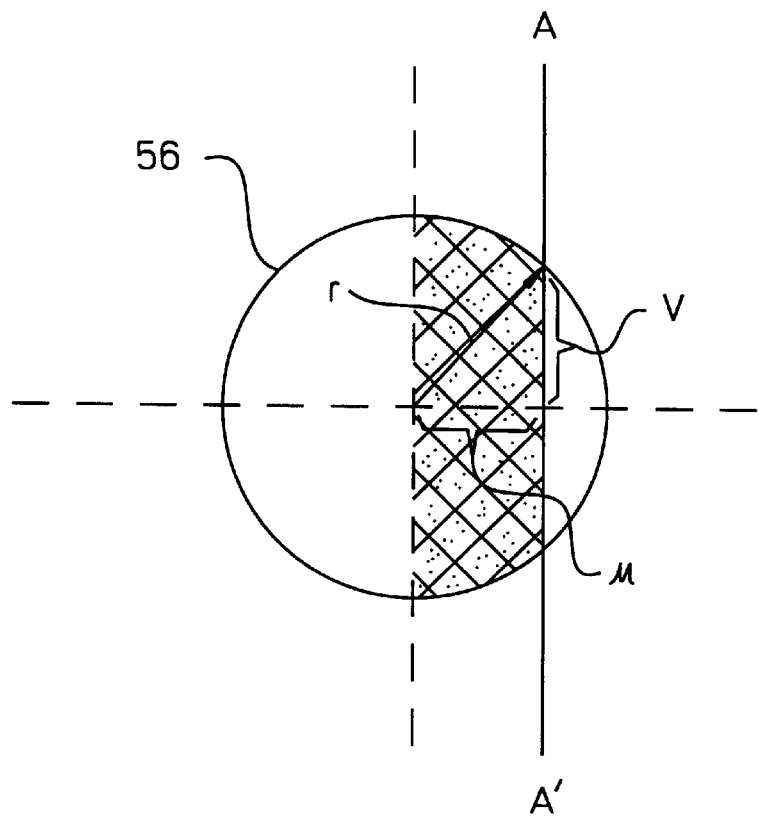
FIGS. 8A and 8B are diagrams illustrating the approach for determining the horizontal position of the imaged spot on the quad detector.
Figure 8B:
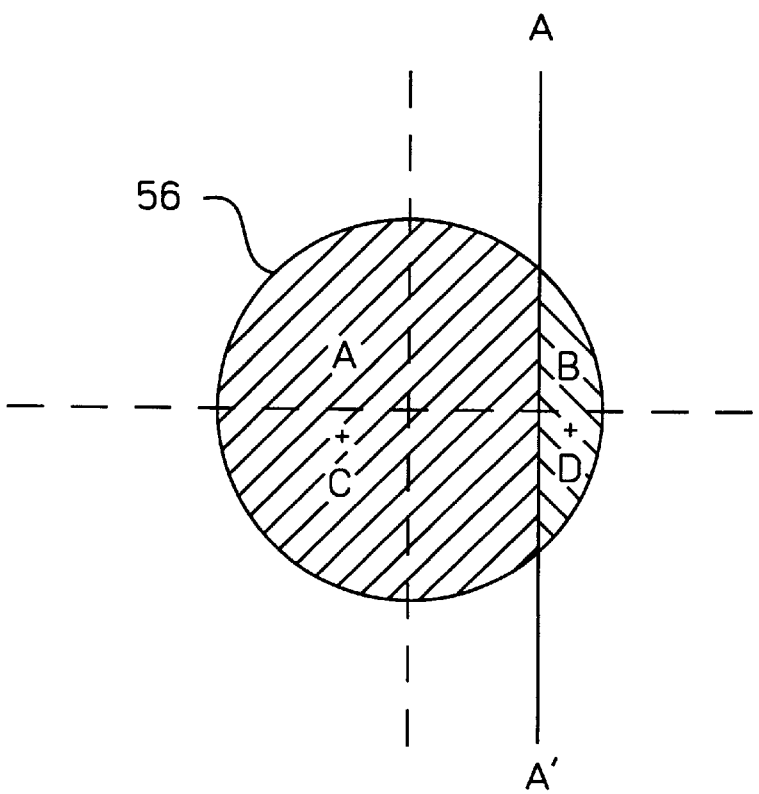

The approach for determining the horizontal position of the imaged spot 56 on the detector 46 is as follows. First, the distance u shown in FIG. 8A is determined. In FIG. 8A, the left part of line A–A' is associated with that part of the image 56 which falls in quadrants A and C of the detector 46, and the right side of line A–A' is associated with that part of the image 56 which falls in quadrants B and D of the detector 46. In determining the value of the distance u, an intermediate problem is first solved to find the area of the image 56 to the left side of line A–A'. This is the energy impinging on quadrants A and C as shown in FIG. 8B.

First, the cross-hatched area shown in FIG. 8A is given by the following equation.

$$u(r^2-u^2)^{1/2}+r^2 \sin^{-1}(u/r) \qquad (1)$$

It turns out that the amount of energy (A+C)−(B+D) is equivalent to twice the cross-hatched area computed according to the above equation. Hence, the area corresponding to (A+C)−(B+D) is given by the following equation $$2[u(r^2-u^2)^{1/2}+r^2 \sin^{-1}(u/r)] \qquad (2)$$

Using the signals produced by the detector 46, the microprocessor 38 determines various values. These values include the following:

$$v\_delta=(A+B)-(C+D) \qquad (3)$$

$$u\_delta=(A+C)-(B+D) \qquad (4)$$

$$QuadSum=A+B+C+D \qquad (5)$$

The host computer 29 takes the reported u_delta, v_delta and QuadSum values and performs calculations to produce u and v point of aim coordinates relative to the detector 46. These detected relative values are denoted (u,v) as there are many rotations, scales and displacements which are necessary to convert to true target coordinates (x,y).

Although the host computer 29 is able to directly compute the u, v coordinates, the use of a look-up table enables faster execution times as the look-up function is much easier to process than direct computation. When using a look-up table, it is preferable to normalize the energy values. Hence, the normalized energy value for horizontal position is determined by the following equation.

$$\frac{(A+C)-(B+D)}{A+B+C+D} \qquad (6)$$

Normalization allows the use of look-up tables to convert the normalized energy values to u. The energy detected is normalized so that the magnitude of the range of values submitted to the look-up table is always within the range between zero and one.

A representative look-up table contains multiple entries and each entry contains the following four values:

(1) area(i): This value is the magnitude of the normalized area as reported by the detector, namely $$\left| \frac{(A+C)-(B+D)}{A+B+C+D} \right|$$

(2) u(i): This is the u value corresponding to area(i)
(3) delta_area(i): This is the value of area(i)−area(i−1)
(4) delta_u(i): This is the value of u(i)−u(i−1)

In the case where the reported normalized area is negative, the area(i) value obtained is multiplied by −1 as the look-up table contains only positive values. The look-up operation is accomplished by finding the entry in the look-up table such that the reported area is greater than the value area(i−1) and less than area(i). To speed the look-up process, it is safely assumed that the current value will be close to the last value. The look-up value produced by the representative look-up table is as follows:

$$u(i-1) + \text{delta\_}u(i) * \frac{(\text{reported area} - \text{area}(i-1))}{\text{delta\_area}(i)}$$

If the reported normalized area was negative initially and then multiplied by −1 as discussed above, then the look-up value produced by the look-up table is also multiplied by −1. The representative look-up table is also populated with values such that the error in interpolation is guaranteed to be less than a specified value which is acceptable for the application in which the invention is being used. Moreover, the same look-up table can be used for both u and v determinations.

Figure 9A:
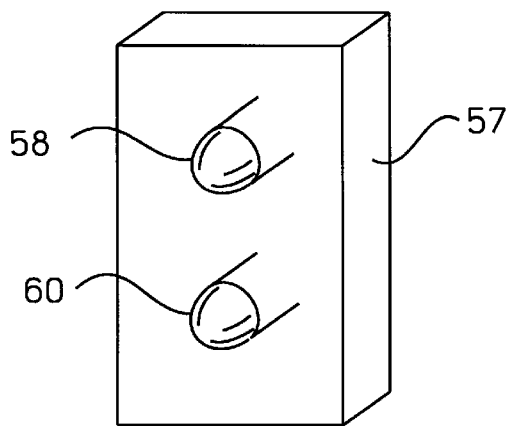
FIG. 9A is a diagram of an emitter device having a first emitter and a second emitter.

The approach for determining rotation or cant of the remote device 8 or the shooting apparatus 14 is now described with reference to FIGS. 9A, 9B, 9C and 10. Although only one emitter is needed to determine point of aim, to determine cant or rotation at least two emitters are needed (FIG. 9A). The general approach for determining cant or rotation is to first determine the cant or rotation of the detector. Then, the cant or rotation of the shooting apparatus 14 is determined by transforming the cant or rotation for the detector to adjust for any offset from the detector to the shooting apparatus.

First, a two emitter device is described. FIG. 9A is a diagram of an emitter device 57 having a first emitter 58 and a second emitter 60. The second emitter 60 is positioned a known distance and orientation from the first emitter 58. The first emitter 58 is known as the auxiliary emitter and the second emitter 60 is known as the reference emitter. The relative positioning between the first and second emitters, although known, is arbitrary and need not be vertically aligned as shown in FIG. 9A.

Figure 9B:
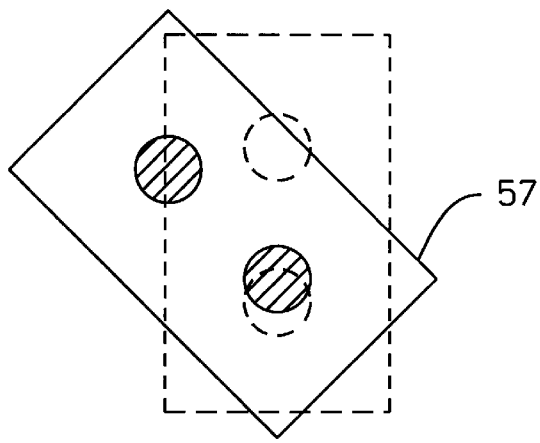
FIG. 9B is a diagram of the emitter device shown in FIG. 9A in a rotated position.
Figure 9C:
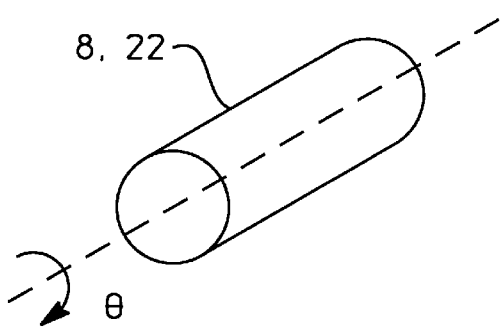
FIG. 9C is a diagram illustrating a diagram of a detector and an angle of rotation ($\theta$)

FIG. 9B is a diagram of the emitter device 57 in a rotated position. Although the emitter device 57 is itself normally in a fixed position with respect to a target (preferably vertically upright as discussed below), the detector assembly 22 (likewise the remote device 8) is generally free to rotate about a line which would connect the detector to the emitter. FIG. 9C illustrates a schematic diagram of the detector assembly 22 and the angle of rotation (θ) As the detector assembly 22 is rotated, the imaged spots 56 corresponding to the emitters 58, 60 will appear to the detector assembly 22 to have rotated. In particular, if the detector assembly 22 is rotated about forty-five degrees to the right, then the detector assembly 22 will see the emitter device 57 rotated to the left as shown in FIG. 9B.

Figure 10:
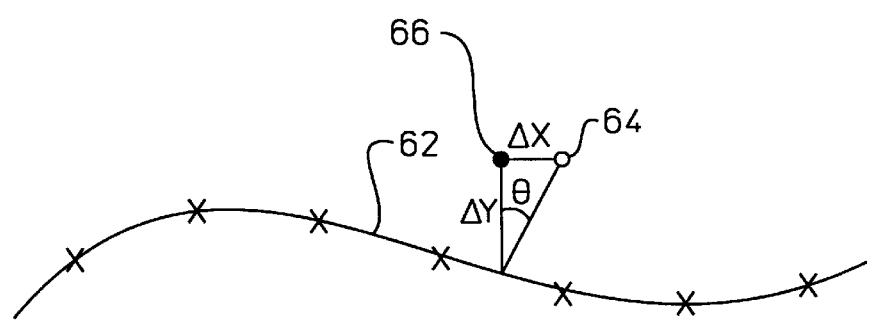
FIG. 10 is a graph of a curve used in determining angle of rotation or cant of a detector.

To determine angle of rotation or cant of the detector, the samples from the reference emitter 60 are used to generate a curve. An example of such a curve is the curve 62 illustrated in FIG. 10. Each "X" shown in FIG. 10 represents a reported sample value associated with the signal received from the reference emitter 60. The sample values produce the curve 62 using a polynomial line fit (or other line fits) using known approaches. Because the fitting of the polynomial (e.g., quadratic) curve is an expensive operation in terms of processing time, it need only be done when the rotation or cant angle is needed with high precision. Simple linear interpolation can be used when high precision is not required. It is preferable to use only a small number of points given the processing complexity and these points are those stable points obtained just prior to the shot event. Once the curve 62 has been determined, the equation of the curve 62 is used to determine an estimate of the point of aim at any place along the curve. Then, using a sample of the auxiliary emitter 58 which is reported within the region of the curve (i.e., also just prior to the shot event), the system determines how the auxiliary sample point has been displaced from the expected position with respect to the curve 62. As shown in FIG. 10, an auxiliary sample point appears at point 64 which is offset from the curve 62 and displaced from where it was expected. In particular, because the auxiliary emitter 58 is offset from the reference emitter 60 (see FIG. 9A), it is expected that without any rotation of the detector assembly 22, the auxiliary sample point would be at point 66 which is directly above the curve generated by the reference points. Instead, the auxiliary sample point appears at point 64, thus indicating the detector assembly 22 has been rotated or canted.

It is assumed that the emitters are fixed and vertically aligned and that the detector is aimed close to the emitters with the detector rotated or canted θ degrees counter clockwise. This will cause a clockwise rotation of the position of the auxiliary point relative to the position of the reference point. The difference between the actual auxiliary point 64 and the computed "expected" point 66 yields errors (displacements) of ΔX and ΔY. The angle for the cant is then determined by arctan(ΔX/ΔY). For zero degrees rotation, the angle of rotation is zero, which means vertically upward based on the assumptions. Although the above discussion determined the angle of rotation or cant using a single auxiliary sample point, is should be recognized that greater accuracy might result by averaging angles at several nearby points or even fitting a curve to the auxiliary sample points and then determining displacements between the two curves in a more complex manner.

For a properly calibrated system with emitters separated by a known amount, a scale factor mapping the computed u, v coordinates to u', v' scaled can be performed. A ratio or scale factor can be determined by dividing the known separation of the emitters by the detected separation. Alternatively, a course measure of distance to the emitters is possible.

As the viewing angle of the remote device 8 or shooting apparatus 14 with respect to the emitters 6, 18 changes, the detector can detect a change in the detected separation of the two emitters. Since the actual separation of the emitters is known, the viewing angle of the remote device 8 or the shooting apparatus 14 (within the plane of the emitters) can be determined from the separation of the two emitters as viewed by the detector. There are, however, limits to how far from side to side the remote device can be moved from being directly in front of the emitters. For example, between 0 and 70 degrees left or right, the viewing angle can easily be resolved, but beyond 70 degrees the difficulty increases until 90 degrees where the viewing angle becomes impossible to resolve. There will also be ambiguity with respect to positive or negative viewing angle.

The infrared energy being output at each of the emitters varies with time. Namely, the infrared energy being output by each emitter is modulated. By modulating the energy (e.g., infrared light) being output by the emitters, the detector can detect reception of the emitted energy and can reduce the effects of noise. Although numerous modulation schemes may be utilized, FIGS. 9D and 9E provide a modulation approach which provides high noise immunity for an implementation using two emitters, a reference emitter and an auxiliary emitter.

FIG. 9D illustrates a waveform trace for the modulation of a frame period beginning with the reference emitter, and FIG. 9E illustrates a waveform trace for the modulation of a frame period beginning with the auxiliary emitter. The emitters are modulated at 1440 Hz with a $\frac{1}{120}$th second frame period. The modulation of the emitters causes pulses to be formed when the emitters are radiating energy. Note only one of the emitters is active at a time. Within each frame period, the modulation scheme first enables the detector to synchronize with the emitter, and then obtains a first set of sampled data and a second set of sampled data. Of the various states within a frame period shown with respect to FIGS. 9D and 9E, wait_edge_1 and wait_edge_2, as well as the complete state, concern synchronization, wait_state_0 through wait_state_4 concern obtaining the first set of sampled data, and wait_state_12 through wait_state_16 concern obtaining the second set of sampled data. The wait_edge states form a synchronization region and the wait_states form a sampling region. Also, the width of the pulse appearing during wait_state_2 is used to indicate whether the received energy corresponds to the reference emitter or the auxiliary emitter. These various states are explained further with respect to FIGS. 12A, 12B, 13A and 13B. The synchronization region simplifies programming, but is not strictly necessary as synchronization can be obtained merely from the sampled energy values. When the amount of rotation is constrained, sampled reference and auxiliary energy values can be distinguished by their relative positions.

It should be noted that the notation "s" appearing in FIGS. 9D and 9E indicates sampling of the received energy by the detector. More particularly, in each state containing the "s" notation, each of the quadrants of the detector are sampled. It is preferable to sample the incoming energy impinging on the detector after the rising edge of the signal to allow the signals presented to the analog-to-digital converter 36 and then the processor 38 to stabilize.

The first set of sampled data is obtained as follows. In wait_state_0, wait_state_2 and wait_state_4, the background signals impinging on each quadrant are sampled. In wait_state_1 and wait_state_3, the emitter signal together with the background noise for each quadrant are sampled.

The second set of sampled data is obtained as follows. In wait_state_12, wait_state_14 and wait_state_16, the background signals impinging on each quadrant are sampled. In wait_state_13 and wait_state_15, the emitter signal together with the background noise for each quadrant are sampled.

The first set of sampled data is denoted as normal resolution data because this data will be transmitted to the host computer 29 when the point of aim is being tracked. The second set of sampled data is denoted as high resolution data because this data is transmitted to the host computer 29 only when the high resolution data is requested or useful. Specifically, the normal resolution data is sufficient for accurate tracking of point of aim and rotation, but the additional data denoted high resolution data is useful when determining shot placement. Note that it is the combination of the normal resolution data and the high resolution data which actually provides the high resolution by effectively sampling at $\frac{1}{240}$th second. Also note that the pulse in wait_state_2 identifies the active emitter in the first sampling region. The active emitter for the second sampling region is known based on the first emitter but need not be the same emitter. Other implementations of the invention may require continuous high resolution data or none at all.

The modulation scheme described with reference to FIGS. 9D and 9E is particularly good at eliminating noise components. The elimination of noise is very important, especially with high precision embodiments. There are two major classes of noise which the system should resist. The first class of noise concerns constant or nearly constant signals. The second class of noise concerns relatively high frequency noise, e.g., 120 Hz optical noise from lighting systems and other sources which may vary during a sample interval.

The constant or nearly constant noise (first class) will not change significantly during the sampling period in which the data is sampled. Hence, the background signal samples obtained before, between, and after sampling of the emitter and background signal samples are averaged together, thereby estimating the background noise. The emitter and background signal samples are referred to as combined signal samples. The averaged background noise is subtracted from the combined signal samples. This substraction operation suppresses the constant noise in the combined signal samples and leaves the emitter signal samples. Samples from each quadrant of the detector are treated in this manner.

The second class of noise, although not constant, can also be effectively suppressed. In this case, the noise has a relatively high frequency compared to the background noise. Suppression of this class of noise is discussed in two situations. In a first situation, the sampling occurs during a rising or falling edge of the background noise signal. Here, the value of the noise at the sampling of the combined signal is essentially the average of the background noise signals. Thus, the averaging followed by subtraction approach used with the first class of noise, is also effective in suppressing the background noise in the first situation.

In a second situation, the sampling occurs during the positive or negative peak of the background noise signal. A positive peak situation is illustrated in FIG. 9F. In this situation, the subtraction does not suppress the noise. Nevertheless, the modulation scheme together with normalization over all the quadrants operates to sufficiently suppress the background noise, provided the signal-to-noise ratio of the emitter is sufficiently high. For quadrant A, after subtracting the averaged background noise from the sampled combined signal, the resulting signal ($SC_A$) would be as follows:

$$SC_A = S_A + \Delta N$$

where $S_A$ is the desired emitter signal for quadrant A and $\Delta N$ is the unwanted noise component. The other remaining quadrants will all have very similar noise components because all quadrants are sampled at roughly the same time with respect to the background noise signal (i.e., the rate of sampling between quadrants is very high compared to the frequency of the noise). Further, because normalized values are used in determining the position of the imaged spot 56 on the detector 46, it turns out that what is ideally determined using equation (3) for the vertical positioning, becomes $$\frac{(A+B)-(C+D)}{A+B+C+D+4\Delta N} \quad (4)$$

due to the presence of the background noise in the second situation. As shown by the above equation, the ΔN error term is only present in the denominator and is quite small in comparison to the sum of A+B+C+D, and therefore, causes very little error. By sampling at a rate significantly higher than 120 Hz and by transmitting radiation from the emitter with a sufficient signal-to-noise ratio, this remaining noise term after normalization becomes insignificant. However, if particularly high precision is desired, the emitter pulses can be synchronized (e.g., phase locked) with the high frequency noise so as to minimize the impact of the second class of noise.

FIG. 11A is a flowchart of the overall operations performed by a shooting practice method according to the invention. The shooting practice method 100 begins by activating 102 the detector assembly 22. It is assumed that the emitters 18 which are located proximate to the target 16 are always transmitting in a modulated fashion, though this is not necessary. Next, position and shot data are collected 104. The collection 104 of the position and shot data occurs regardless of whether a projectile was actually shot (e.g., dry fire mode or live fire mode). The method then places 106 a shot in accordance with the position and shot data. During dry fire, the placing 106 of the shot predicts with high accuracy where the shot would have hit the target 16. During live fire, the placement of the shot matches with high accuracy where the shot actually hits the target 16. Finally, results are shown 108 to the user. Near real-time display of the results to the user is available though computationally more demanding.

Figure 11B:
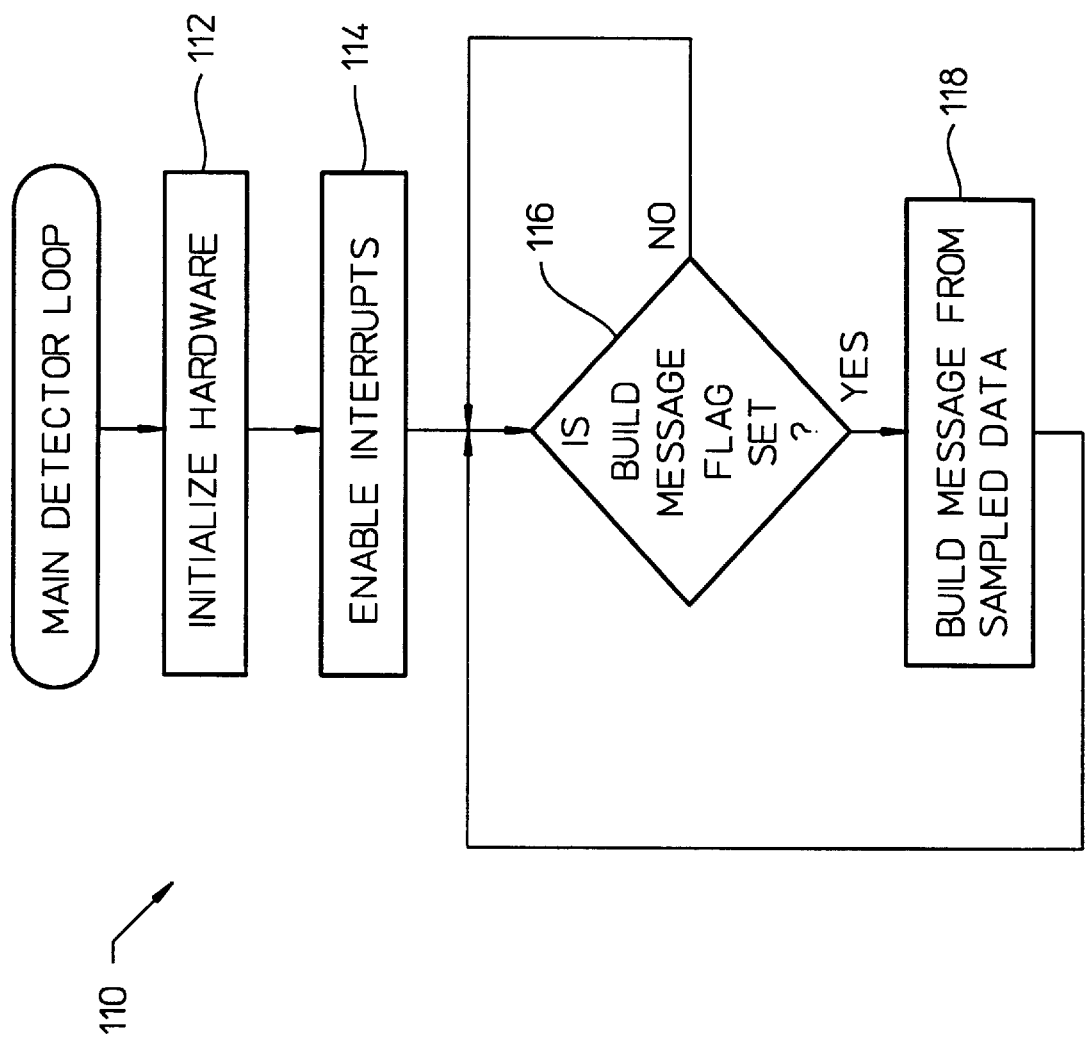
FIG. 11B is a flowchart of a main loop for data acquisition in the shooting practice method according to the invention.

FIG. 11B is a flowchart of a main detector loop of a shooting practice method according to the invention. A main loop 110 is a continuous loop which is executed by the processor 38 until interrupted by certain events. Initially, the hardware is initialized 112 and the various interrupts associated with the embodiment are enabled 114. A decision 116 is then made based on the state of a build message flag. If the build message flag is set, then a message is built 118 from the sample data. Otherwise, the processor 38 waits until the build message flag is set.

Figure 12A:
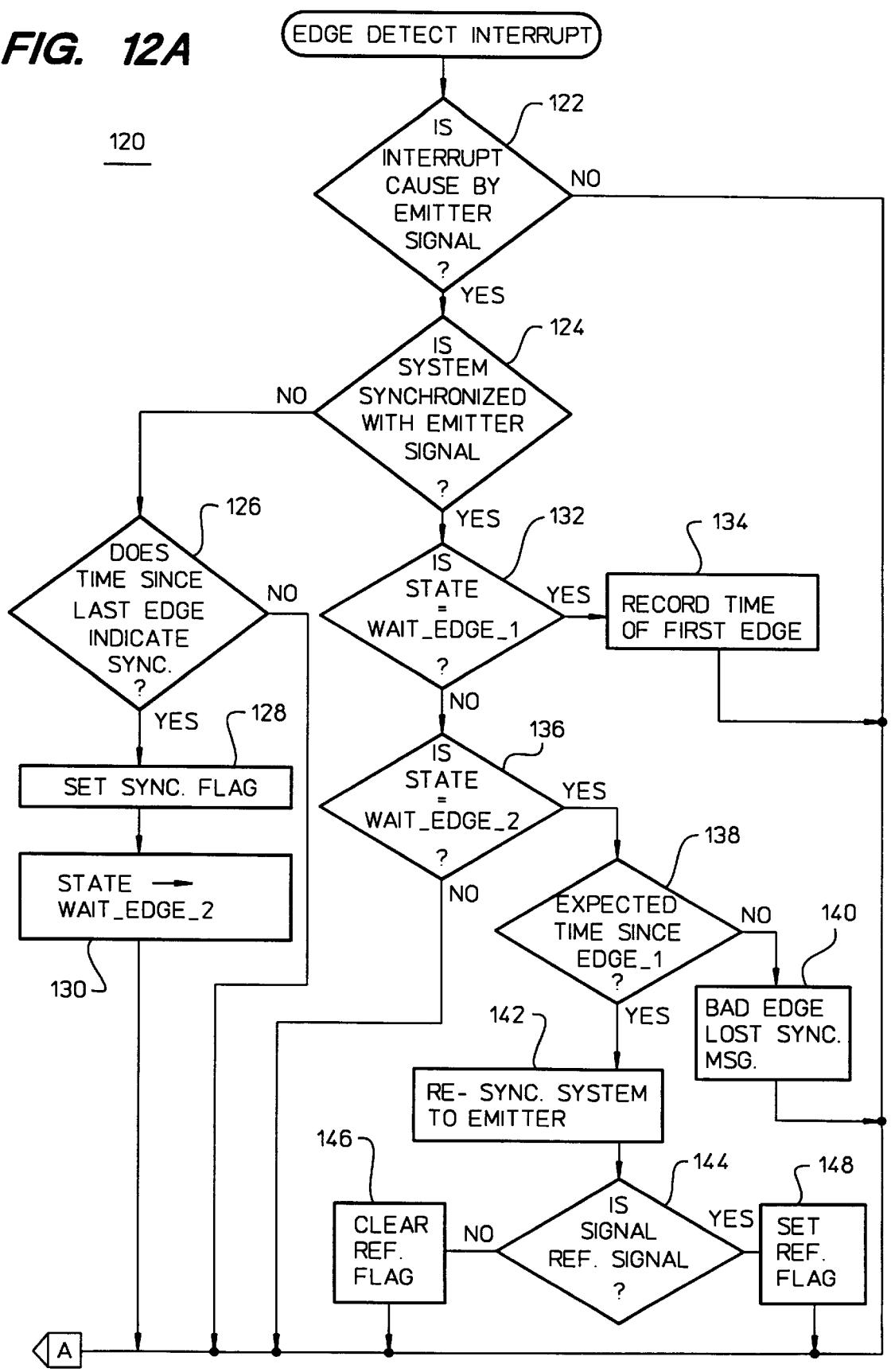
FIGS. 12A and 12B are flowcharts illustrating an edge detection interrupt routine of the shooting practice method.
Figure 12B:
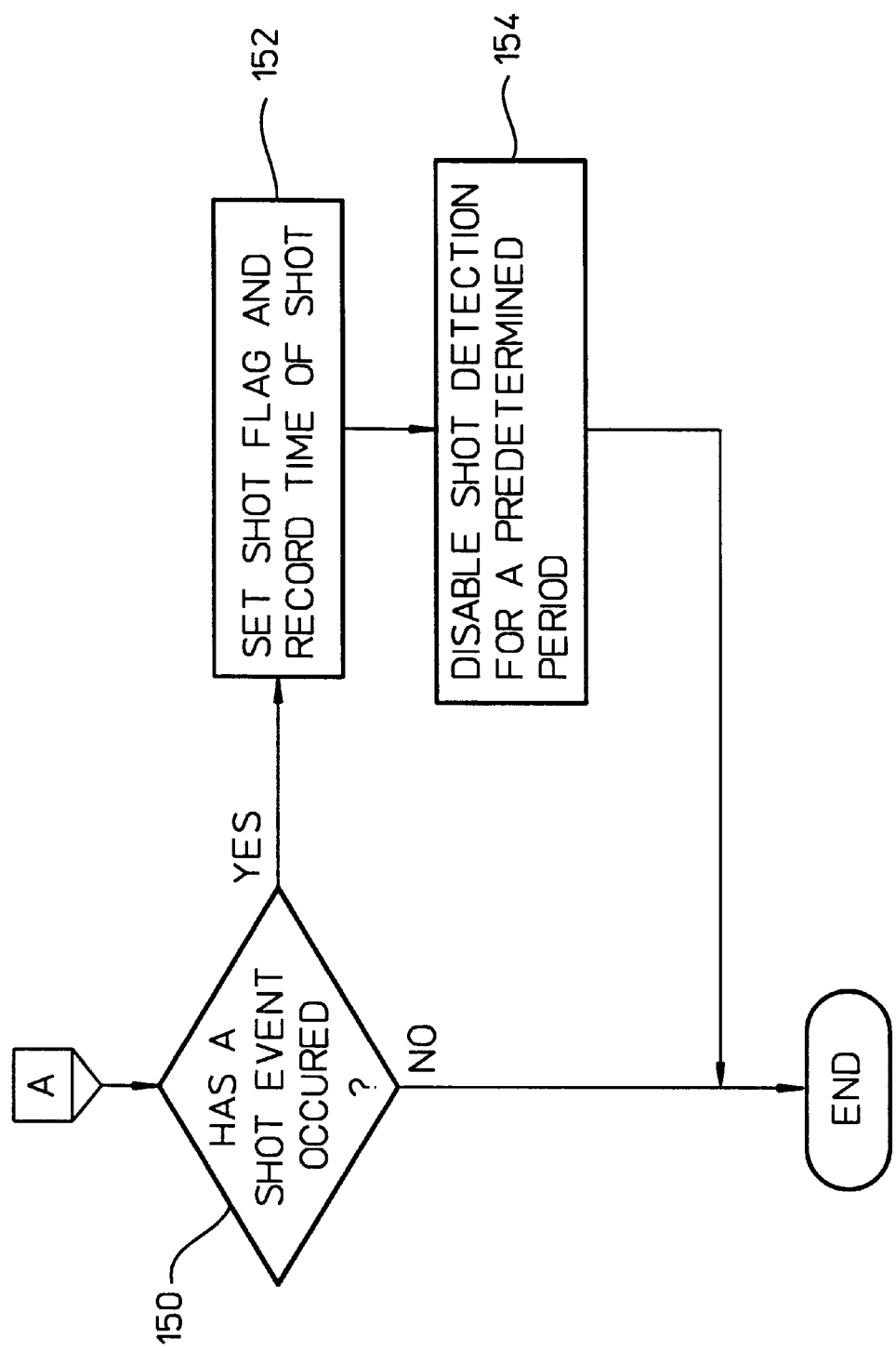

One of the interrupts associated with the shooting practice method is an edge detect interrupt 120 which is illustrated in the flowchart shown in FIGS. 12A and 12B. This interrupt 120 detects a rising edge of either a shot event or a received emitter signal and causes the processor 38 to perform certain processing tasks as detailed in FIGS. 12A and 12B.

The edge detect interrupt routine 120 begins with a decision 122 based on whether the interrupt is caused by an emitter signal. If the interrupt is not caused by an emitter signal, the processing is not concerned with synchronization but with a shot event. The processing performed concerning shot event detection is described below after the processing for the emitter signal (FIG. 12B).

On the other hand, when the decision 122 determines that the interrupt was caused by an emitter signal, synchronization processing is performed. First, a decision 124 is made based on whether the system is currently synchronized with the emitter signal. When the system is not currently synchronized with the emitter signal, a decision 126 is made based on the time since the last edge of the emitter signal. Specifically, if the time since the last edge of the emitter signal does not indicate synchronization, no further synchronization processing is needed because synchronization is not yet available. On the other hand, if the time since the last edge of the emitter signal does indicate synchronization, the decision 126 causes the edge detect interrupt routine 120 to set 128 a synchronization flag and to set 130 a state indicator to wait_edge_2.

If, on the other hand, the decision 124 indicates the system is currently synchronized with the emitter signal, further processing is performed to confirm synchronization and to indicate whether the received emitter signal is either a reference signal or an auxiliary signal. First, a decision 132 is made based on the state of the state indicator. If the state indicator indicates that the current state is wait_edge_1, the time of the first edge is recorded 134. This recorded time of the first edge is later used to confirm that the emitter signal timing is still valid.

If the state indicator indicates that the state is not in wait_edge_1 but in wait_edge_2, a decision 136 causes further processing to be performed. In particular, a decision 138 is made based on a comparison of the measured time since edge_1 with an expected time since edge_1. If the measured time is not the same as the expected time, given some small tolerance range, synchronization is deemed to be lost and an appropriate message 140 is prepared. On the other hand, when the measured time and the expected time are the same, the decision 138 causes the system to be resynchronized 142 to the emitter signal. The advantage of resynchronizing the processor to the emitter every period is that small timing variations become unimportant and the system remains locked to the emitter signal. Following block 142, a decision 144 is made based on whether the received emitter signal is the reference signal or the auxiliary signal. The reference signal is distinguished from the auxiliary signal by the pulse width of the signal (compare the pulses in FIGS. 9D and 9E in wait_state_2). Hence, at this point in the processing, if the signal is present, the auxiliary signal is present; otherwise, the reference signal is present. If the received emitter signal is the reference signal, a reference flag is set 148; otherwise, the reference flag is cleared 146, thereby indicating the auxiliary signal.

Following block 122 directly if the interrupt was caused by a shot event or otherwise following the above discussion on synchronization processing, the edge detect interrupt routine 120 performs shot event processing. First, a decision 150 is made based on whether a shot event has occurred. If no shot event has occurred, no further processing is required by the edge detect interrupt routine 120. On the other hand, when a shot event has occurred, a shot flag is set and the time of shot is recorded 152. The time of shot is a reference time which is used later by the system when determining shot placement. In addition, to prevent erroneous shot event interrupts, shot detection is thereafter disabled 154 for a predetermined period of time. This completes the shot event processing.

Another interrupt routine associated with the shooting practice method is a timer-zero (timer-0) interrupt routine 156. The timer-zero interrupt routine 156 is synchronized to the emitter signal so that the emitter signal can be sampled during half cycles. For example, with the emitter signal modulated at 1440 Hz, the sampling rate would be about 0.3 ms. The sampling is carried out by the processing unit 38.

Figure 13A:
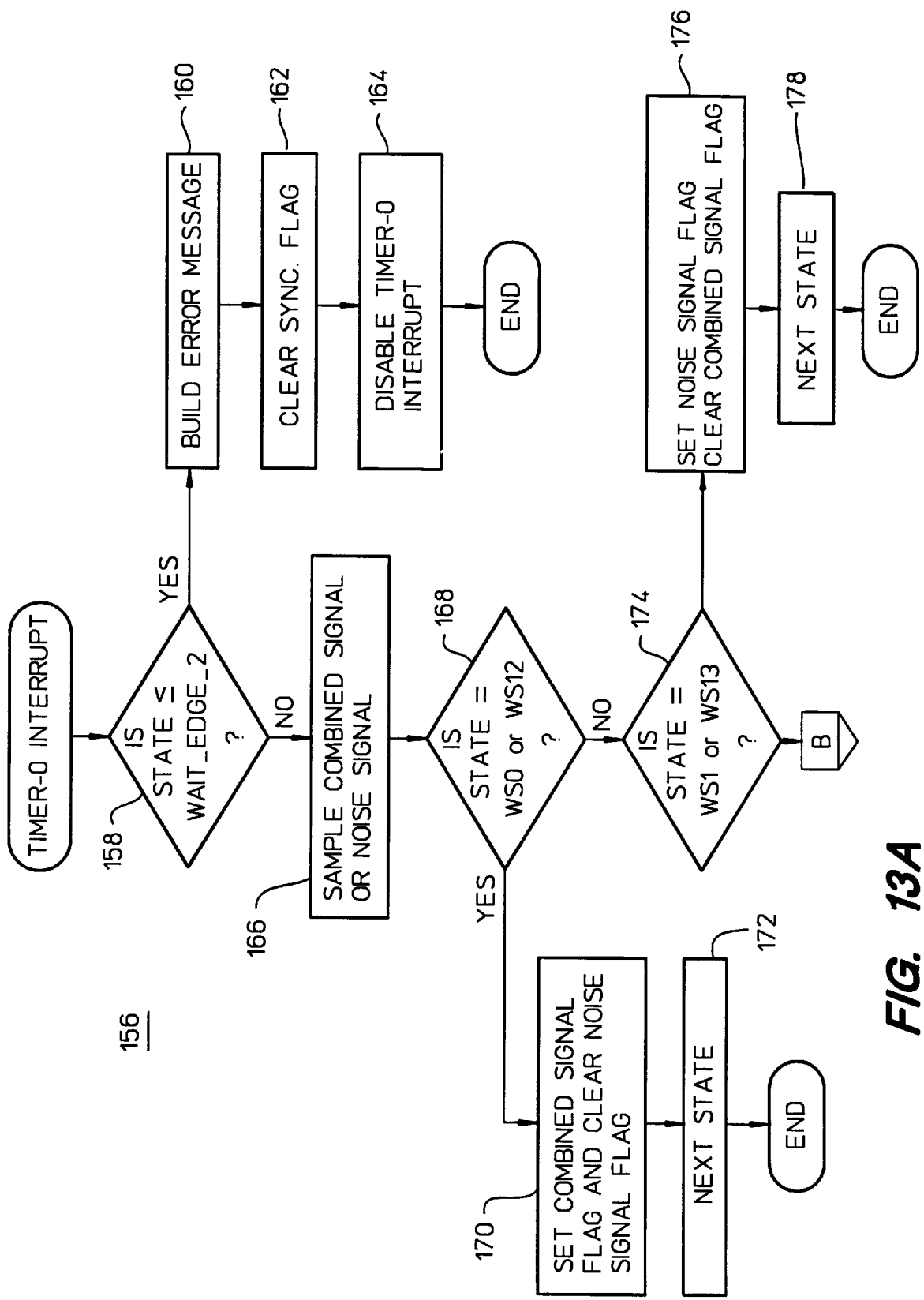
FIGS. 13A and 13C are flowcharts illustrating a timer interrupt routine of the shooting practice method.
Figure 13B:
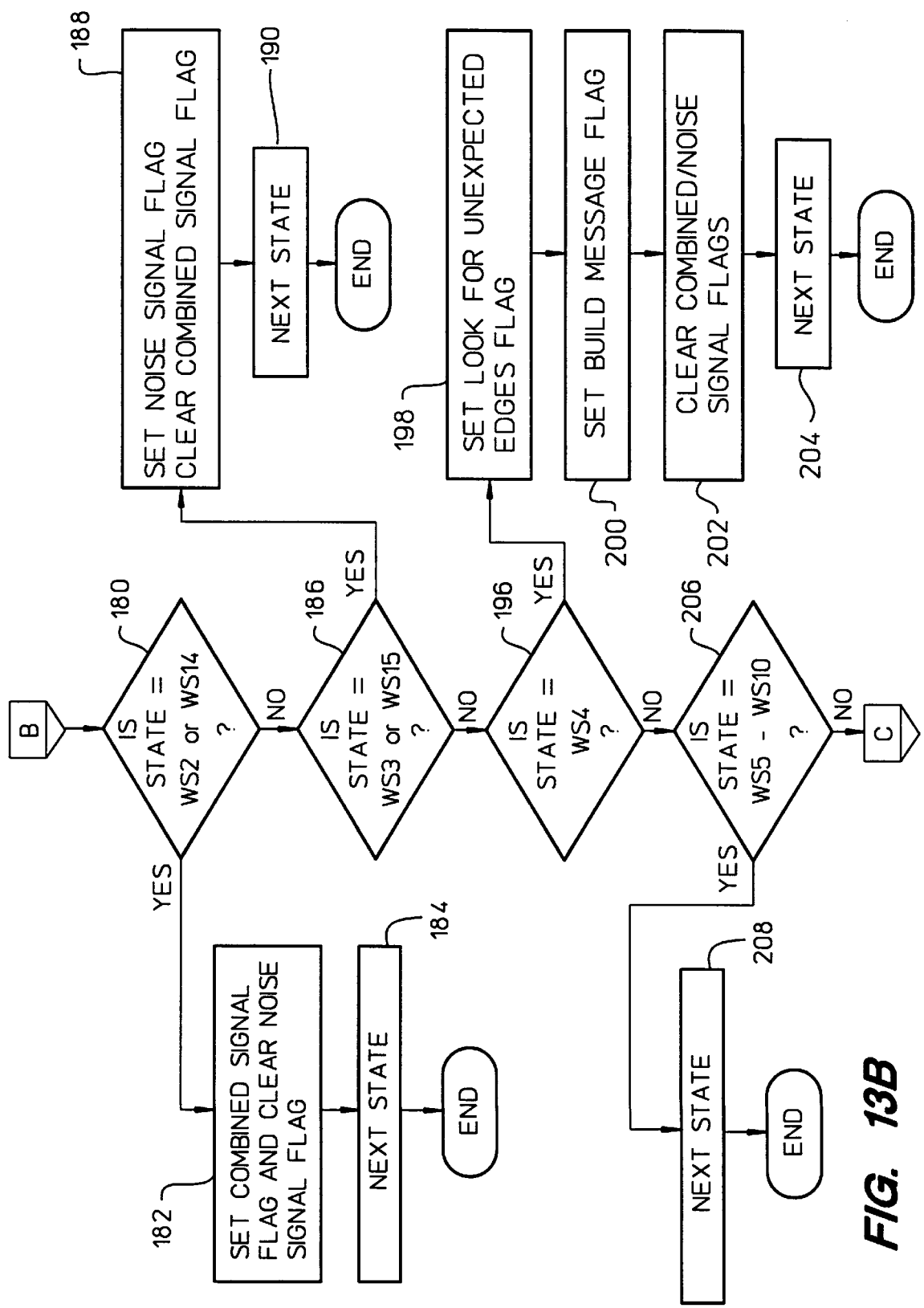
Figure 13C:
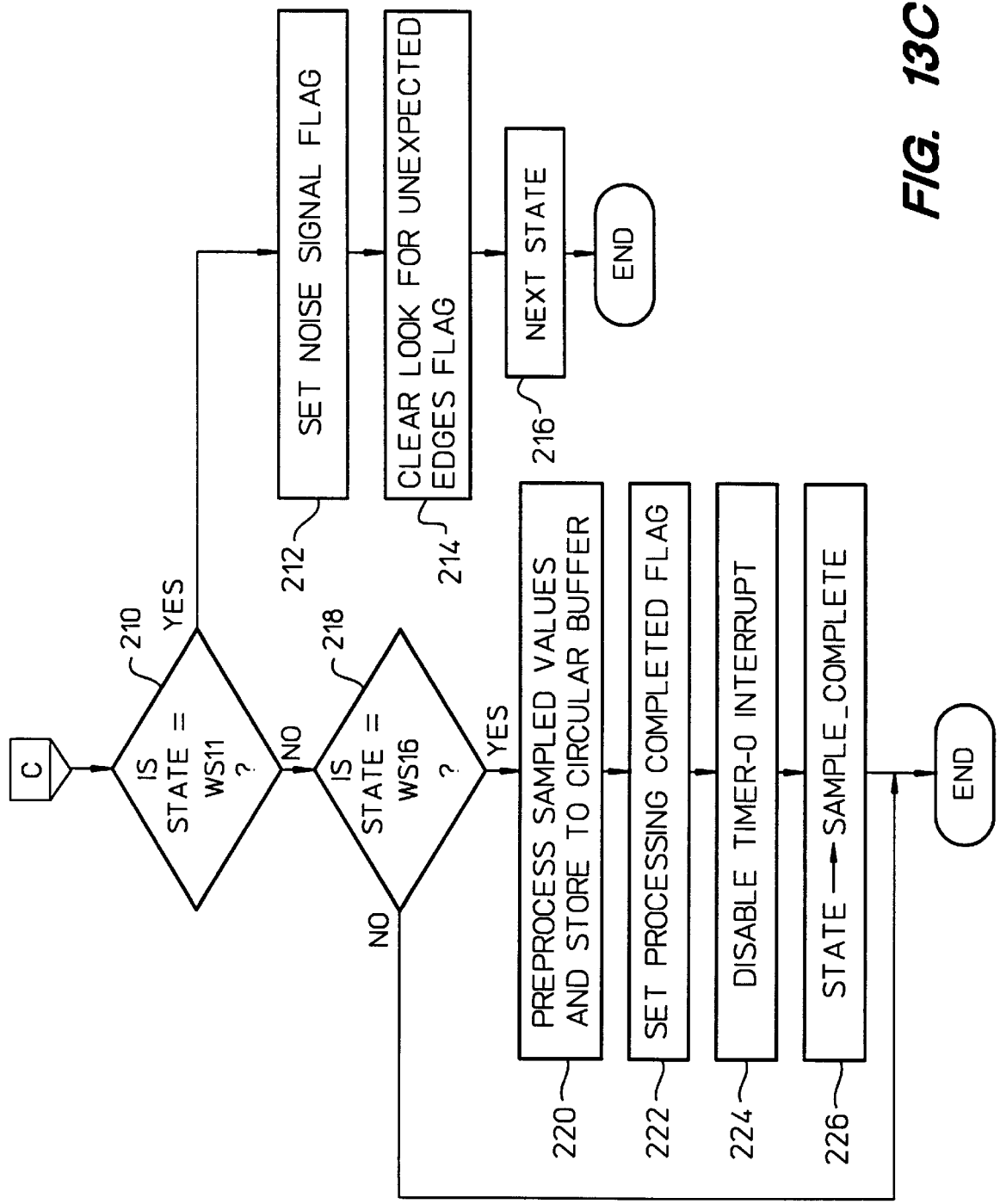

The timer-zero interrupt routine 156 is illustrated in the flowcharts shown in FIGS. 13A and 13B. The timer-zero interrupt routine 156 begins with a decision 158 which is made based on the current state as indicated by the state indicator. If the current state is less than or equal to the wait_edge_2 state, then there is an error condition because sampling should not occur in this region of the modulated emitter signal. Namely, an emitter edge should have been previously detected causing the current state to be greater than wait_edge_2 (see FIG. 12A). In responding to the error, an error message is built 160, the synchronization flag is cleared 162, and the timer-zero interrupt is disabled 164. When the timer-zero interrupt is disabled 164, the sampling session for the emitter signal is canceled. On other hand, if the current state is greater than wait_edge_2, then the decision 158 allows sampling 166 of the received emitter signal if one of a combined signal flag or a noise signal flag is set.

Next, one of decision blocks 168, 174, 180, 186, 196, 206, 210 and 218 is satisfied based on the current state as indicated by the state indicator. Each time the timer-zero interrupt 156 is invoked, only one of the decision blocks 168, 174, 180, 186, 196, 206, 210 and 218 is carried out.

With decision 168, if the current state is either wait_state_zero or wait_state_12, the combined signal flag is set and the noise signal flag is cleared 170, the current state is incremented 172 to the next state, and processing of the interrupt is completed. The combined signal refers to the sampled modulated emitter signal plus background noise. The combined signal flag indicates that in the next state, the sampled data will correspond to the combined signal of the emitter signal and background noise. The noise signal refers to the background noise which is also sampled periodically so that it can be estimated and substantially eliminated or filtered out from the combined signal, thereby leaving the emitter signal. The noise signal flag indicates that in the next state, the sampled data will correspond to the background noise.

With decision 174, if the current state is wait_state_1 or wait_state_13, the noise signal flag is set and the combined signal flag is cleared 176, the current state is incremented 178 to the next state, and processing of the interrupt is completed.

With decision 180, if the current state is wait_state_2 or wait_state_14, the combined signal flag is set and the noise signal flag is cleared 182, the current state is incremented 188 to the next state, and processing of the interrupt is completed.

With decision 186, if the current state is wait_state_3 or wait_state_15, the noise signal flag is set and the combined signal flag is cleared 188, the current state is incremented 190 to the next state, and processing of the interrupt is completed.

With decision 196, if the current state is wait_state_4, then a flag is set 198 to look for unexpected edges, a build message flag is set 200, the combined and noise signal flags are cleared 202, the current state is incremented 204 to the next state, and processing of the interrupt is completed. Hence, successive timer-zero interrupts have sampled background noise, then the combined signal, then the background noise, then the combined signal, and then the background again. This completes the first of two sampling sessions within a given modulation frame. The build message flag which is set 198 here is used in block 118 of the main loop 110 (FIG. 11B) to construct a message to forward data to the host computer 29.

With decision 206, if the current state is wait_state_5 through wait_state_10, the current state is incremented 208 to the next state, and the processing of the interrupt is completed. The region encompassing wait_state_5 through wait_state_10 simply keeps track of the timing within the sampling period until the second sampling session is reached.

With decision 210, if the current state is wait_state_11, then the noise signal flag is set 212, the flag for looking for unexpected edges is cleared 214, the current state is incremented 216 to the next state, and processing of the interrupt is completed. Thereafter, the second sampling session takes place in the states from wait_state_12 to wait_state_15 in a manner similar to the first sampling session.

Finally, with decision 218, if the current state is equal to wait_state_16, sampled values are preprocessed and stored 220 to a circular buffer, a processing completed flag is set 222, timer-0 interrupt is disabled 224, and the current state is changed 226 to sample_complete state. This completes the second of two sampling sessions within a given modulation frame. The preprocessing associated with block 220 includes averaging sample values for the quadrants A–D of the detector, subtracting the averaged background noise signals from the averaged combined signals, and temporarily storing the resulting signals. Other processing is performed only when the system knows it will need the data, thereby saving processing time.

Yet another interrupt routine associated with the shooting practice method is a timer-one (timer-1) interrupt routine. This interrupt concerns preparation and transmittal of information from the processing unit 26 to the host computer 29, and fixing the duration of the modulation frame. Here, the modulation frame is fixed at 120 Hz to provide periodic processing every $\frac{1}{120}$th of a second.

Figure 14A:
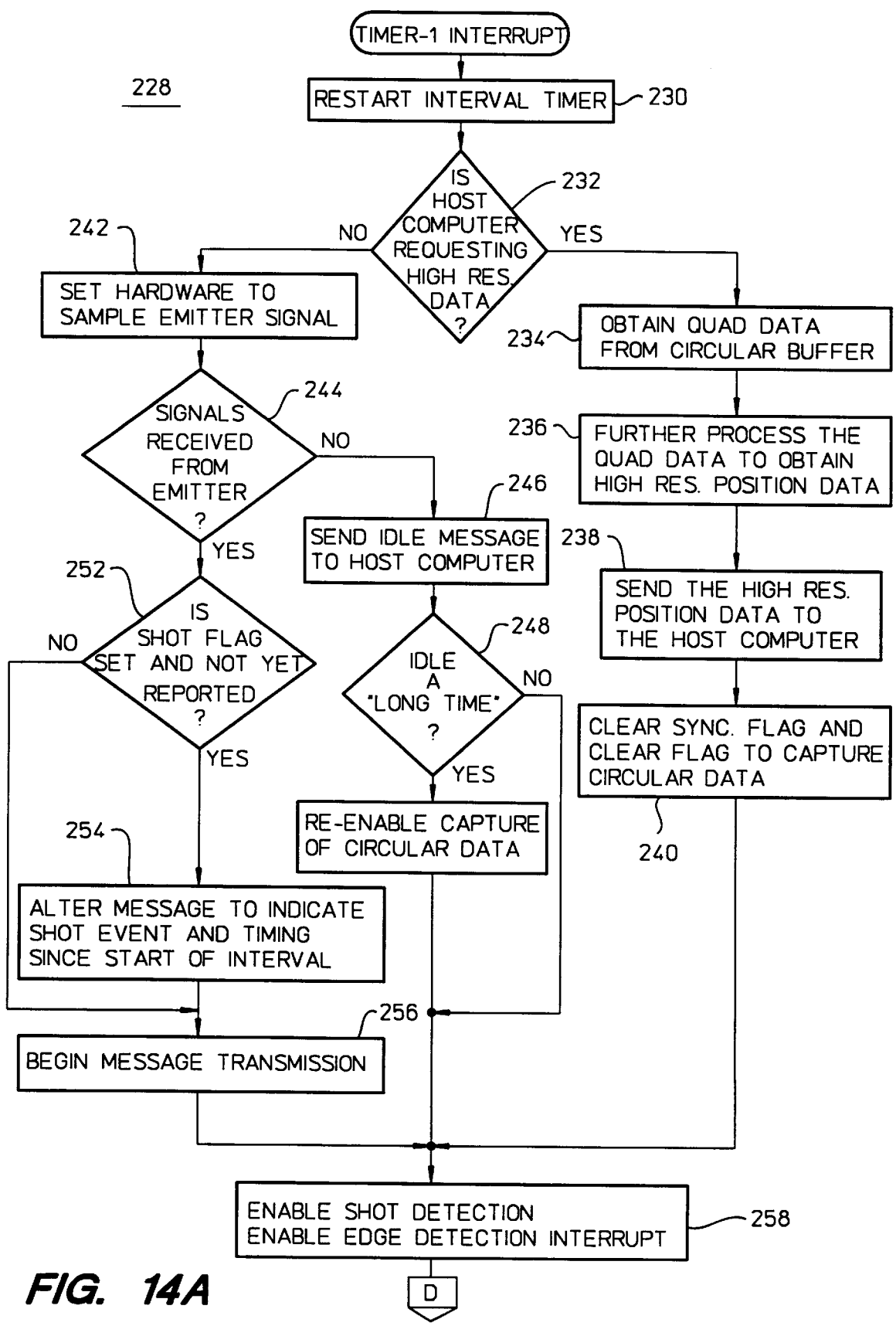
FIGS. 14A and 14B are flowcharts illustrating another timer interrupt routine of the shooting practice method.
Figure 14B:
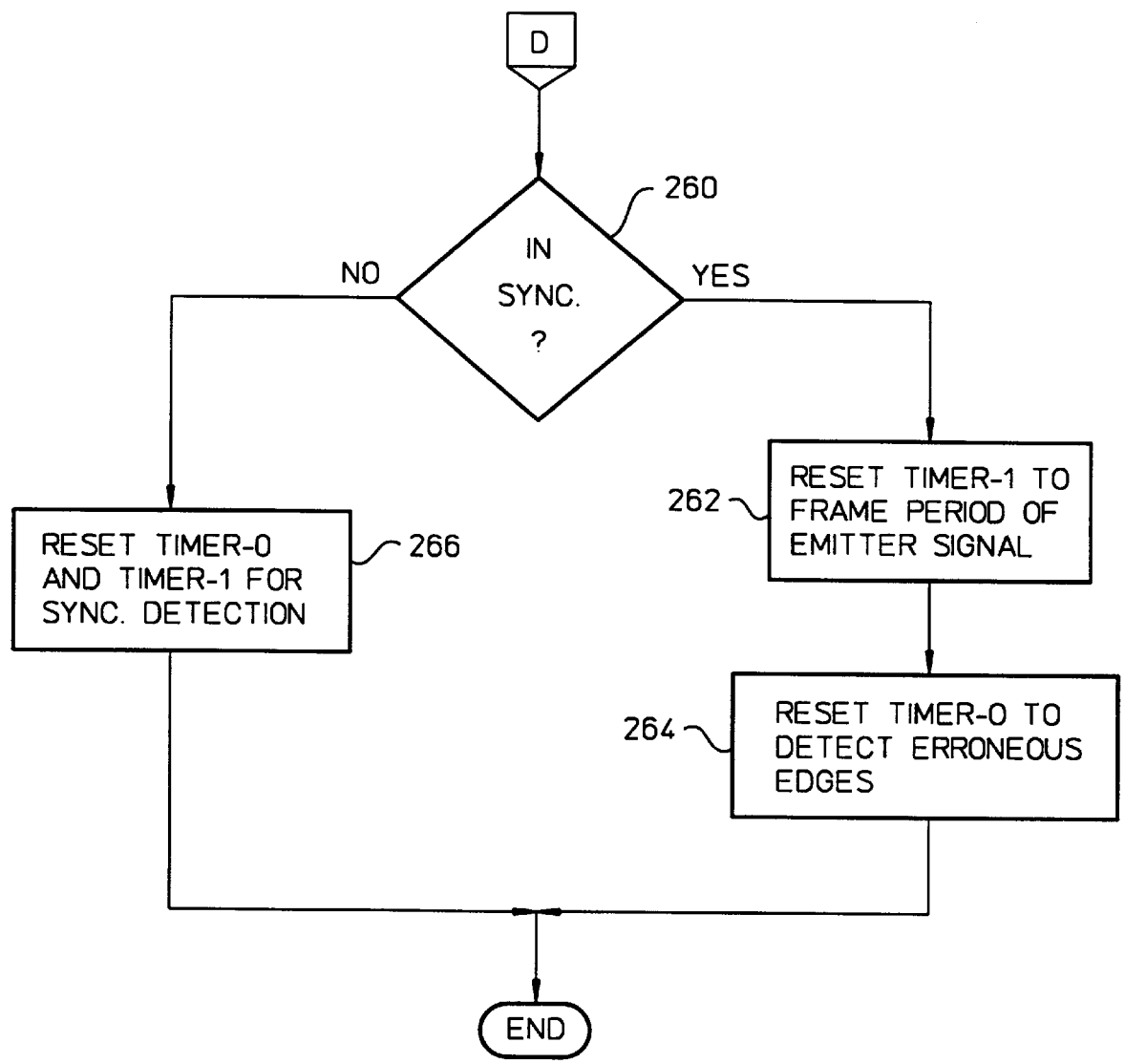

A timer-one interrupt routine 228 associated with the timer-one interrupt is shown in FIGS. 14A and 14B. Each time the timer-one interrupt routine begins, an interval timer is restarted 230. The interval timer serves to count the time in microseconds since the start of the 120 Hz modulation frame. The value of the counter is captured when a shot event occurs. The timer value is then used for reporting the time a shot occurred. Values of the counter are also captured by hardware when edge interrupts are generated. These additional values of the counter corresponding to the edge interrupts are used to test for synchronization with the emitter as described in blocks 126, 134 and 138 in FIG. 12A.

Next, a decision 232 is made based whether the host computer 29 is requesting high resolution data. The host computer 29 will request high resolution data when a shot event has been reported. The high resolution data is used in high accuracy shot placement which is discussed in detail below with reference to FIGS. 16 and 18–20. If the host computer 29 is requesting high resolution data, the quad data is obtained 234 from the circular buffer. Recall, the quad data stored in the circular buffer includes the energy values A, B, C and D detected by the quad detector 46. The quad data is then further processed 236 to obtain the high resolution position data. The further processing here is performed by the processing unit 26 and includes determining the following values: v_delta, u_delta, and QuadSum using equations (3), (4) and (5) described above. The high resolution position data is then sent 238 to the host computer 29. Thereafter, the synchronization flag and the flag to capture circular data are cleared 240. The synchronization flag is cleared 240 here because in the described implementation, the sending 238 of the high resolution position data to the host computer 29 will take more time than available in order to maintain synchronization.

On the other hand, if the host computer 29 is not requesting high resolution data, the decision 232 performs different processing to enable sampling of the normal resolution data and its transmission to the host computer 29. First, the system hardware is set 242 to sample the received emitter signal. This setting 242 of the system hardware includes setting the quad switch 32 to select the quadrant A data, and setting flags to sample background noise. The quadrants are preferably sampled in symmetric order about the center of the sampling interval, such as ABCDDCBA where the center is between the two D samples. A decision 244 is then made based on whether the system has been able to receive and sample signals from the emitter. If signals have not been received and sampled, the system remains idle and an idle message is sent 246 to the host computer 29. This situation would occur when the shooting apparatus 14 is not being pointed towards the target 16. However, a decision 248 monitors whether the system has remained idle for a sufficient "long time." If the decision 248 determines that the system has remained idle for a "long time," then the capture of circular data (high resolution data) is re-enabled 250. This reset condition occurs, for example, when the host computer 29 has ignored the data received by the detector assembly 22 and the processing unit 26 for some time after the last shot.

Alternatively, when decision 244 determines that the emitter signal has been received and sampled, normal resolution data is available to be reported to the host computer 29. Thereafter, a decision 252 is made based on the status of a shot flag. Namely, if the shot flag is set and not yet reported, the message built in the main loop is altered 254 to indicate the occurrence of a shot event and its timing since the start of the interval. Regardless of whether block 254 is performed, following block 252 when answered in the negative or following block 254, message transmission 256 to the host computer begins.

Following blocks 240, 250 and 256, shot detection and edge detection interrupt are enabled 258 for detection of the next shot and its placement. Note that while these interrupts have been disabled, the hardware of the processing unit 26 is still able to detect shot timing should a shot event occur during this section of code. Next, a decision 260 is made based on the presence of synchronization. If synchronization is present, timer-one is reset 262 to the frequency (frame period) of the emitter signal, and timer-zero is reset 264 to detect erroneous edges. On the other hand, if the synchronization is not present, timer-zero and timer-one are reset 266 for synchronization detection. Following blocks 264 and 266, the timer-one interrupt routine 228 is completed.

Figure 15:
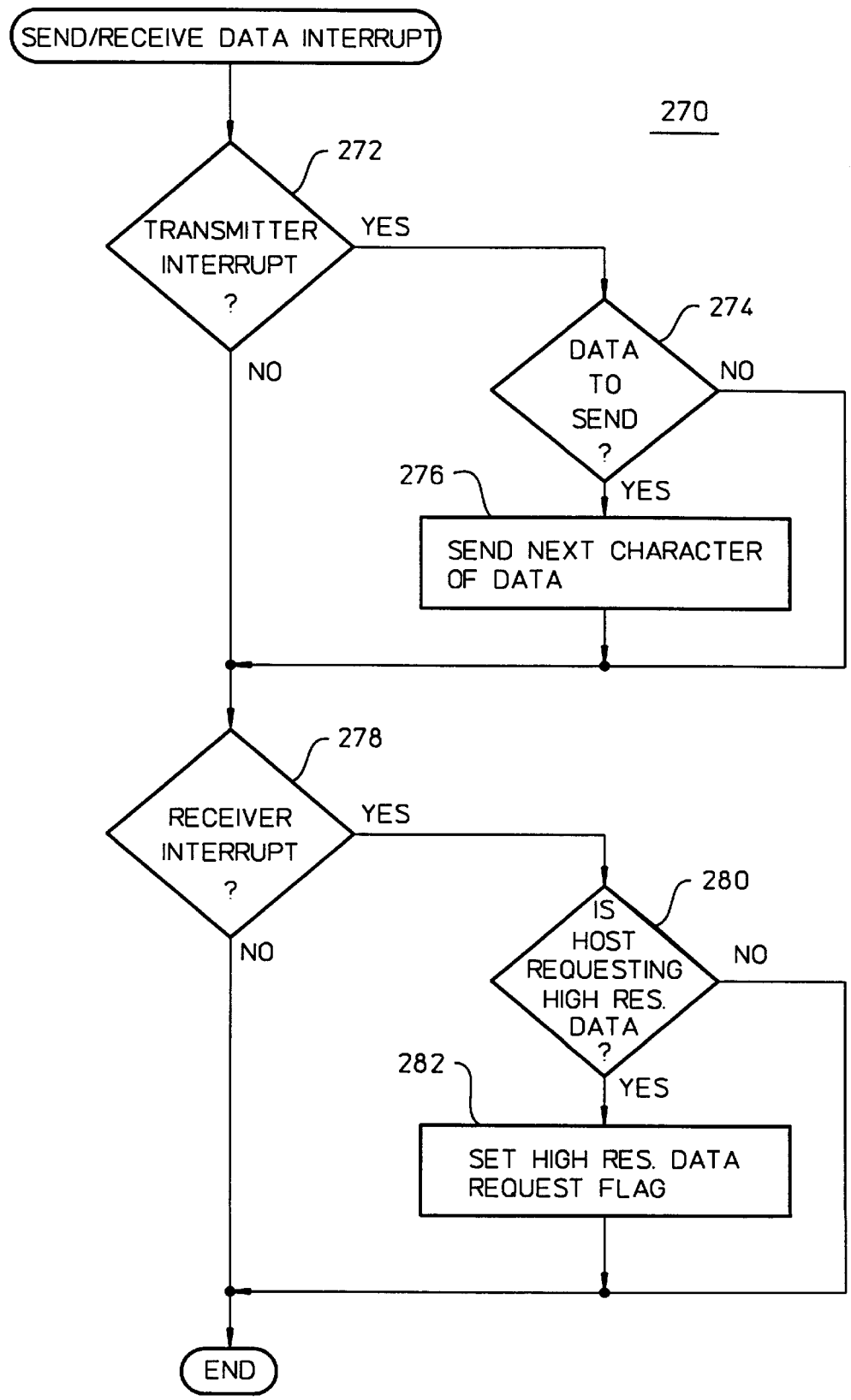
FIG. 15 is a flowchart illustrating a send/receive interrupt routine of the shooting practice method.

FIG. 15 is a flowchart of a send/receive interrupt routine 270. The interrupt routine 270 processes interrupts requested by the processing unit 26 and the host computer 29. First, a decision 272 determines whether the interrupt was requested by a transmitter (within the microprocessor 38) of the processing unit 26. If the transmitter has requested the interrupt, a decision 274 is made based on whether there is data available to be sent. If data is available to be sent, the next character of data is sent 276. Otherwise, the transmission portion of the send/receive interrupt routine 270 is completed. Thereafter, and after the decision 272 is answered negatively, the receiving portion of the send/receive interrupt routine 270 is performed. Here, a decision 278 determines whether the interrupt was requested by the receiver of the host processing system 26. When a receiver (within the microprocessor 38) has requested the interrupt, a decision 280 is made based on whether the host processing system 26 is requesting receipt of the high resolution data. If the decision 280 is answered affirmatively, then the high resolution data request flag is set 282. In any case, following block 282 or the decision 278 when answered negatively, the send/receive data interrupt 270 is completed.

Figure 16:
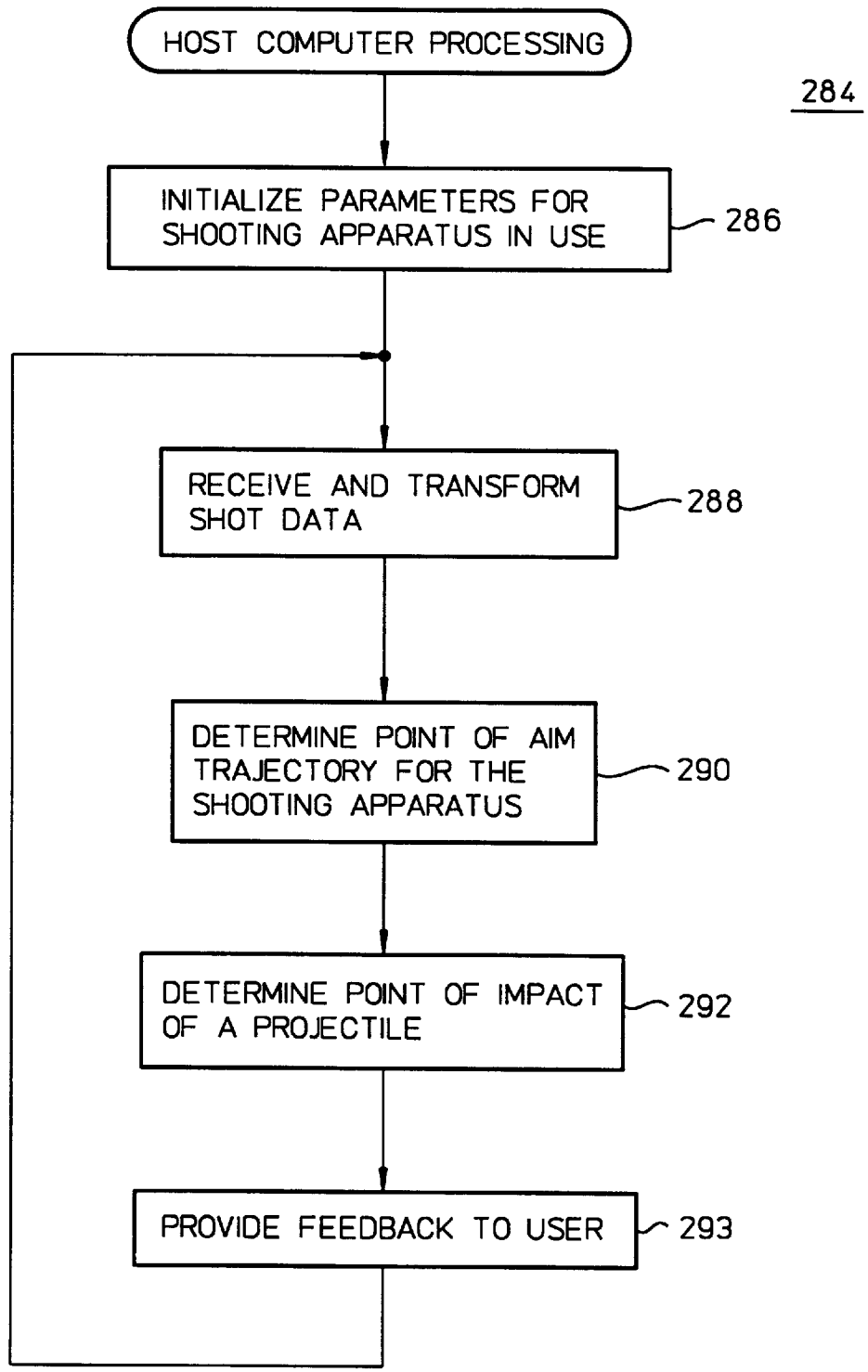
FIG. 16 is a flowchart of the basic operations carried out by a host computer according to the invention.

The host computer 29 performs most of the data processing carried out by the shooting practice system 12. FIG. 16 is a flowchart of the basic operations carried out by the host computer 29. The host computer processing 284 begins by initializing 286 parameters for the shooting apparatus 14 in use. This involves the basic alignment and calibration steps, as well as, setting distance to target, time for shot to leave barrel, spacing between target and emitters, and velocity of projectile. Calibration requires at least one projectile be shot at and strike the target 18. The data obtained from the shot is used to determine the scale, to set a sighted cant angle ($\theta_{c0}$), and to set the offset of the system. The scale (linear scale factor) is set in accordance with the ratio of the measured separation of the emitters to the actual physical separation. The calibration shot is assumed to be fired with the shooting apparatus 14 held at 0° cant (which is actually the cant angle for which the shooting apparatus 14 is sighted (i.e., $\theta_{c0}$). The measured cant angle is thereafter used as the sighted cant angle ($\theta_{c0}$) for subsequent shots. The offset of the system is determined in accordance with the position where the projectile actually hit the target 18 and is used to set the offset of the system (see FIG. 20A and offsets <A(3,1), A(3,2)>discussed below).

Once the host computer 29 is initialized 286, the shot data obtained by the processing unit 26 can be received and transformed 288. The received shot data is initially in detector coordinates (u,v); hence, the received shot data is transformed into target coordinates (X,Y). The host computer processing 284 then determines 290 a point of aim trajectory for the shooting apparatus. The point of aim trajectory indicates how the shooter's point of aim has moved on the target as the shooter was preparing to place a shot on the target. Cant or rotation during the process of firing the shot is also available. In any case, the host computer 29 can also provide 293 real-time feedback to the user (i.e., shooter) during the aiming and shooting process. For example, the real-time feedback could be in the form of a tone or clicks which vary with point of aim.

Next, a point of impact of a projectile is determined 292. Given the shooters point of aim at the time of shot and the movement of the shooting apparatus during the shot, the host computer 29 is able to determine 292 the point of impact of a projectile on the target. The projectile, of course, need not in fact be actually shot towards the target for the host computer 29 to make such a determination 292 (so called dry fire mode).

Figure 17A:
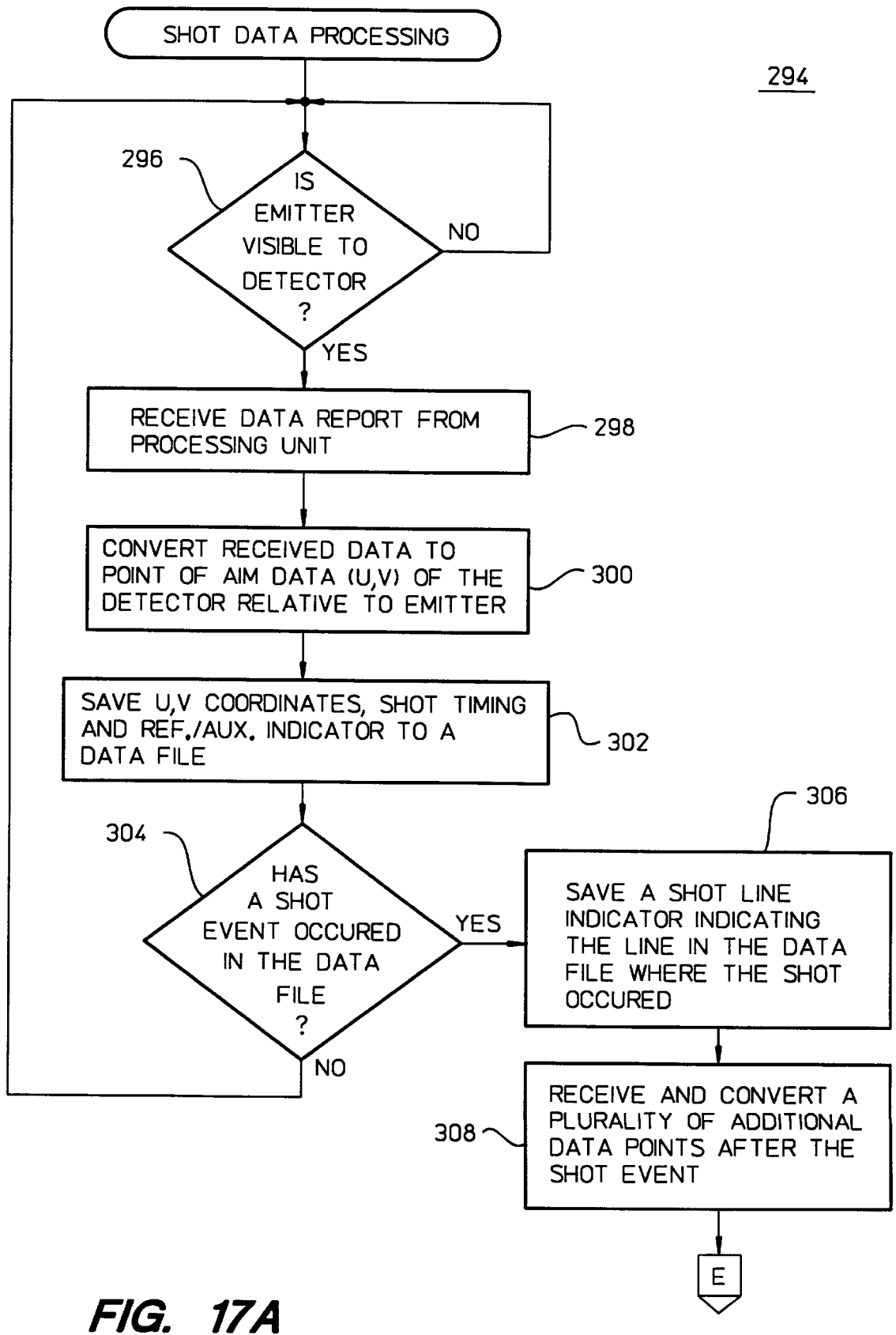
FIGS. 17A and 17B are flowcharts illustrating processing carried out on received shot data by the host computer.
Figure 17B:
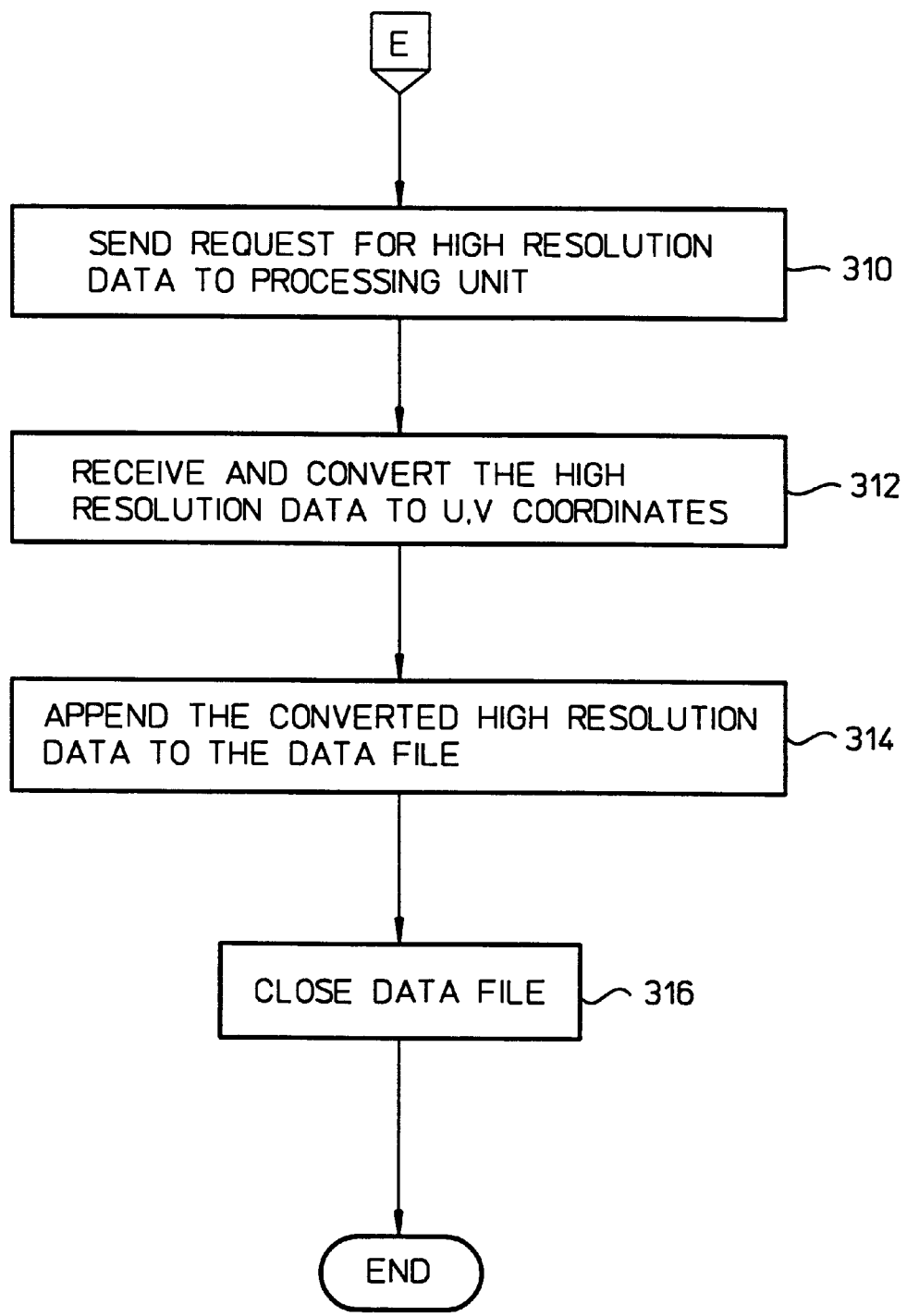

FIGS. 17A and 17B illustrate a flowchart of processing 294 carried out on the received shot data. Preferably, the shot data processing 294 is carried out by the host computer 29. The shot data processing 294 begins with a decision 296 based on whether the emitter 18 is visible to the detector 46. The processing 294 will wait at this stage until the emitter 18 becomes visible to the detector 46. When the emitter 18 does become visible to the detector 46, the shooting apparatus 14 is pointed in the general direction of the target 16. At this point, the shot data processing 294 can proceed.

Once the shot data processing 294 begins, data reports are received 298 from the processing unit 26. The host computer 29 then converts 300 the received data to point of aim data (u,v) of the detector 46 relative to the emitter 18. This resulting point of aim data (U,V) is stored 302 to a data file together with a shot timing value and a reference/auxiliary indicator. The shot timing value is an index indicating if a shot event occurred and, if so, the time in the current sample period at which the shot event occurred. The reference/auxiliary indicator indicates whether the particular entries in the data file correspond to either a reference emitter or an auxiliary emitter.

Next, a decision 304 is made based on whether a shot event has occurred. If a shot event has not occurred, the decision 304 causes blocks 296–302 to be repeated thereby obtaining additional data points. On the other hand, if a shot event has occurred, a shot line indicator is saved 306 to provide an indication of the line in the data file where the shot event occurred. In addition, a plurality of additional data points after the shot event are received and converted 308 to U,V coordinates. These additional data points are gathered in real-time and are later used to show the shooter's follow through motion after releasing the shot.

Following blocks 308, the shot data processing 294 sends 310 a request for high resolution data to the processing unit 26. The high resolution data will be used by the host computer 29 to obtain greater precision and accuracy in the point of aim and shot placement (point of impact) determinations. The high resolution data is then received from the processing unit 26 and converted 312 to point of aim coordinates (U,V). The converted high resolution data is then appended 314 to the data file. Thereafter, the data file is completed and closed 316.

The host computer 29 is able to store several data files corresponding to numerous shots by the shooter or numerous shots by more than one shooter. The trajectory and shot placement information eventually provided to the shooter correspond to a particular data file.

Figure 18A:
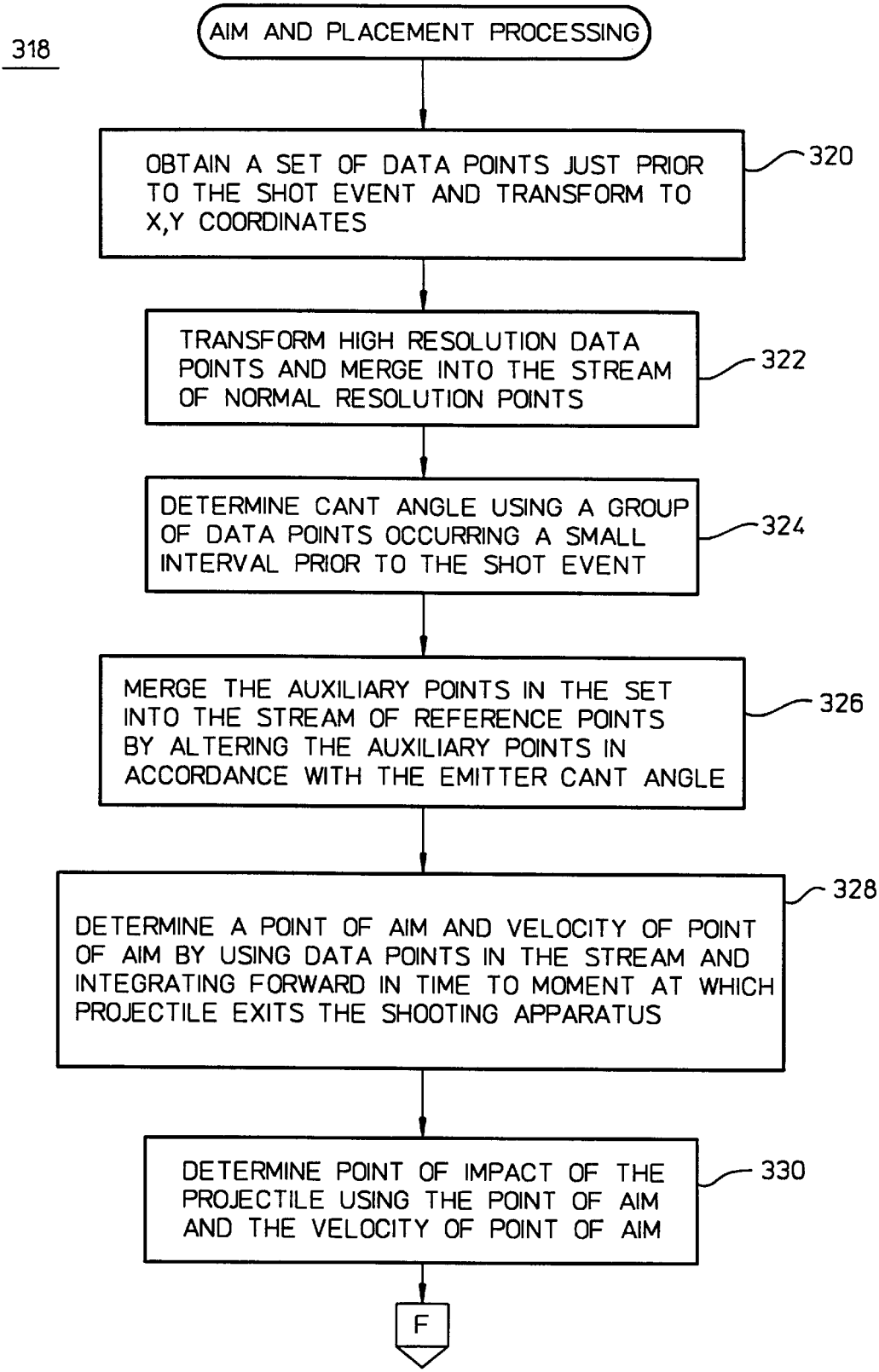
FIGS. 18A and 18B are flowcharts illustrating point of aim and shot placement processing carried out by the host computer.
Figure 18B:
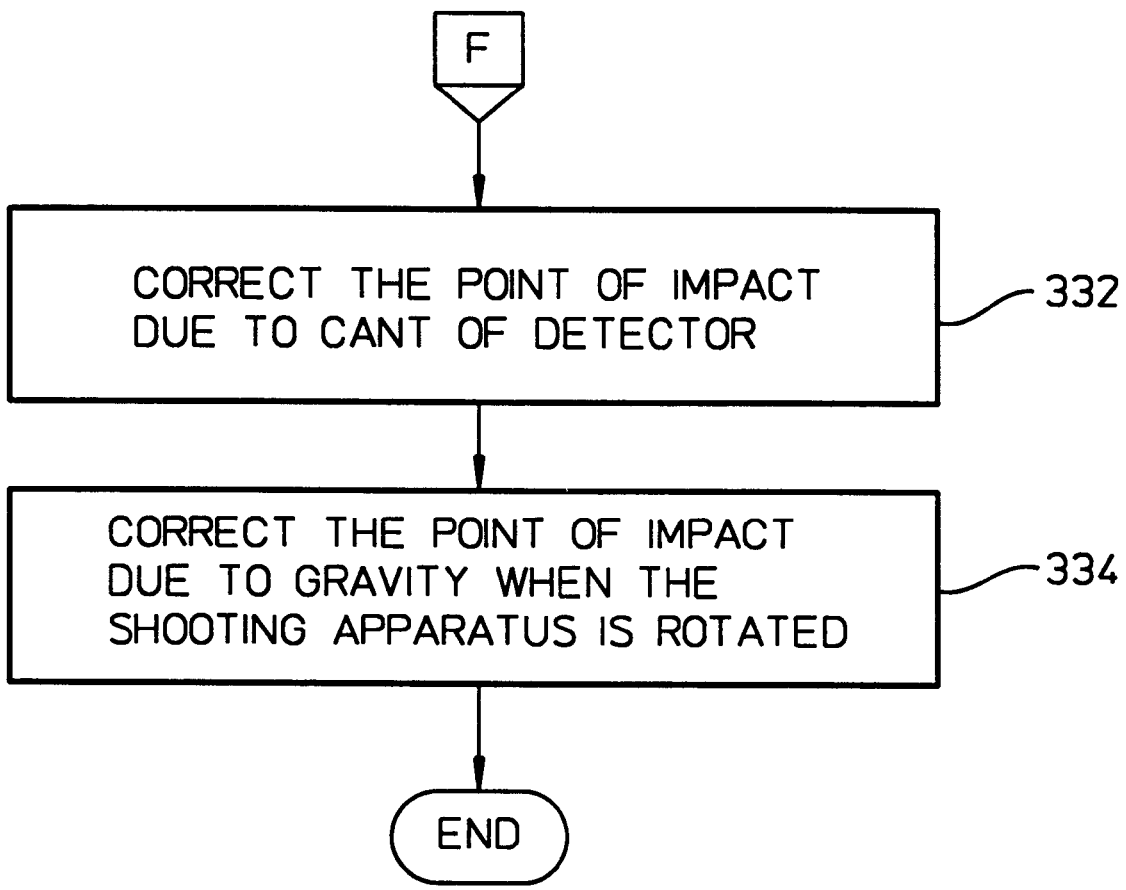

FIGS. 18A and 18B illustrates point of aim and shot placement processing 318 carried out by the host computer 29. Of course, shot placement would not be done in the remote control implementation. The point of aim and shot placement processing 318 begins by obtaining 320 a set of data points just prior to the shot event and then transforming the data points to target coordinates (X,Y). The data points and a shot event indicator are contained within the data file. The high resolution data points are then transformed and merged 322 into the stream of normal resolution data points. At this point, the data points just prior to the shot event form a common stream of high resolution data points. Next, a rotation amount (cant angle) using a group of data points occurring a small interval prior to the shot event is determined 324. The auxiliary points in the obtained set of data points are then merged 326 into the stream of reference points by altering the auxiliary points in accordance with the rotation amount (cant angle). A point of aim and velocity of the point of aim are then determined 328 by using data points in the common stream and integrating forward in time to the moment at which the projectile exits the shooting apparatus 14. The point of impact of the projectile is then determined 330 using the point of aim and the velocity of the point of aim at the moment the projectile exits the shooting apparatus 14.

If desirable, the point of impact may be determined with greater precision and accuracy. This improved accuracy can be obtained by correcting the determined point of impact to compensate for cant of the shooting apparatus 14 (detector assembly 22) and for gravitational forces. Hence, when such greater precision and accuracy is desired, the aim and shot placement processing 318 further includes two additional steps. In the first additional step, the point of impact on the target 16 is corrected 332 due to the cant of the shooting apparatus 14. In the second additional step, the point of impact is corrected 334 due to gravitational forces when the shooting apparatus 14 is rotated during the shot event. These corrections are discussed in greater detail below.

The system 12 is susceptible to several rotations which affect the accuracy with which the system can determine the point of aim and the placement of the shot. A first rotation ($\theta_e$) is the rotation of the emitters from vertical due to misalignment of a mounting bracket or errors in the energy pattern if using multiple sources per emitter. The second rotation ($\theta_d$) is the rotation of the detector from vertical caused by errors in alignment of the detector mounting bracket on the gun. A third rotation ($\theta_t$) is the rotation of the target when in its mounting bracket. While each of these rotations or angles may be kept small, they are typically not zero and can be large enough to cause a significant error in calculations of shot placement if they are not detected and corrected for. However, it is expected that these values will be constant throughout any shooting session.

A fourth rotation ($\theta_c$) is highly variable and of critical importance. The fourth rotation ($\theta_c$) is the angle of cant introduced by shooter's hold while executing the shot, i.e., the cant or rotation of the shooting apparatus which has been previously discussed. This angle ($\theta_c$) may vary during a particular shot as well as between shots. Because shooting apparatuses are correctly sighted for only one cant angle ($\theta_{c0}$), a shooter's variation in the angle ($\theta_c$) from the sighted cant angle ($\theta^{c0}$) can be a significant source of error in one's shooting technique.

The sighted cant angle ($\theta_{c0}$) need not be vertically upright. In fact, many shooter's have a non-vertical hold. Nevertheless, the fourth rotation ($\theta_c$) is a rotation from the sighted cant angle ($\theta_{c0}$) and is a source of error which requires corrections if high accuracy shot placement is to be obtained. For example, if the shooter's hold during a shot is canted to the right from the sighted cant angle ($\theta_{c0}$), then the shot will fall off to the right from the place where the shooting apparatus 14 was aimed during the shot.

The corrections for the X-direction and the Y-direction for the fourth rotation ($\theta_c$) are as follows:

$$\Delta X_{cant} = -d_g \sin \theta_c$$

$$\Delta Y_{cant} = d_g(1 - \cos \theta_c)$$

where $d_g$, the constant distance the projectile falls during flight, is a function of gravity and the time of flight of the projectile, and $\theta_c$ is less than zero for clockwise rotation or cant.

Now that the fourth rotation and its placement correction has been explained. The detection of the fourth rotation ($\theta_c$), also called cant angle, is now further described. Although the first rotation ($\theta_e$) and the second rotation ($\theta_d$) vary with system setup, the fourth rotation ($\theta_c$) varies with the shooter's hold of the shooting apparatus 14. At any moment, the detector sees the emitters at some angle from vertically upright which is a function of $\theta_e$, $\theta_d$ and $\theta_c$. As the detector is rotated in a clock-wise direction, the emitters will seem to rotate in a counter clock-wise direction.

Figure 19A:
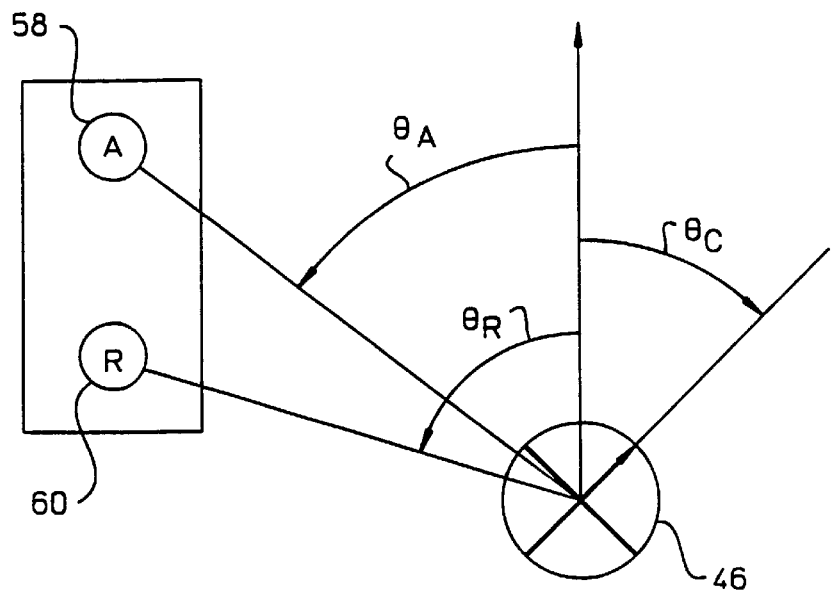
FIGS. 19A–19D are diagrams that explain how the cant angle is obtained.
Figure 19B:
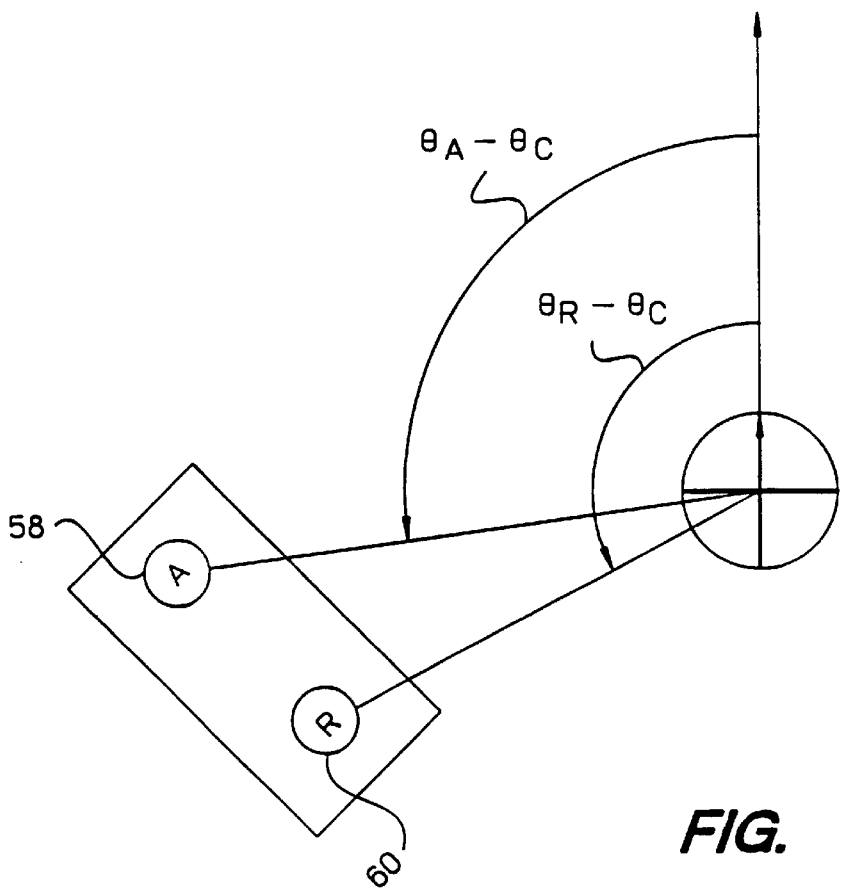

FIGS. 19A–19D are diagrams that explain how the fourth rotation ($\theta_c$) is obtained. These diagrams assume the sighted cant angle ($\theta_{c0}$) is 90° and that $\theta_e=\theta_d=0°$. In FIG. 19A the emitters 58, 60 are upright and vertically aligned, and the detector 46 is canted clock-wise. This would correspond to a shooter whose hold is canted to the right from the sighted cant angle of the shooting apparatus 14. FIG. 19B illustrates an equivalent arrangement of the emitters 58, 60 and the detector 46. In this diagram, the detector 46 is in an upright position which is useful for making computations easier. FIG. 19B is just a rotated version of FIG. 19A, whereby the emitters have been rotated from the positions shown in FIG. 19A $\theta_c$ degrees counter clock-wise about the detector 46.

Figure 19C:
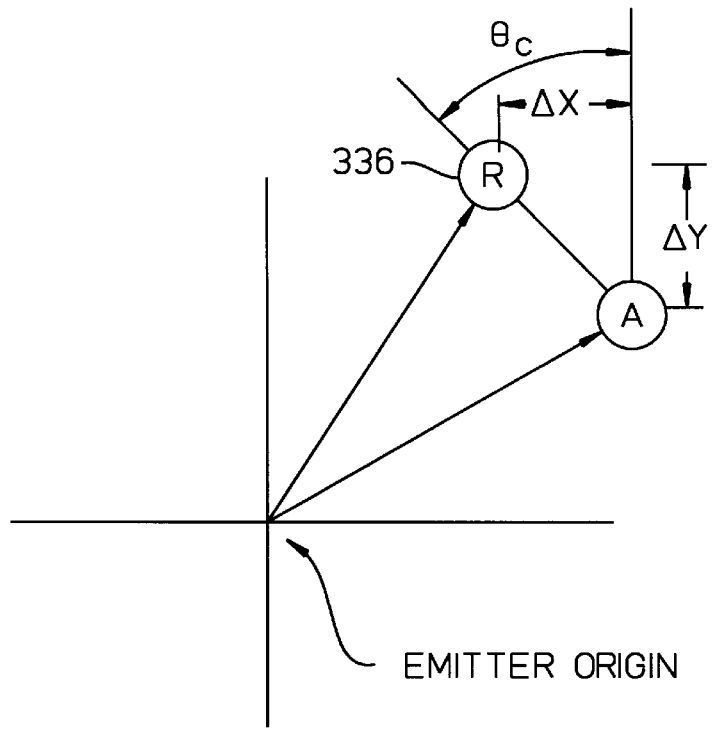

FIG. 19C is a diagram of detector position relative to the emitters 58, 60. Namely, when the reference emitter 60 is active, the detector will appear at position 336 relative to the reference emitter 60, and when the auxiliary emitter 58 is active, the detector will appear at position 338 relative to the auxiliary emitter 58. The cant angle ($\theta_c$) is found using, for example, arctan ($\Delta X/\Delta Y$) or some more elaborate line or curve fit discussed above.

Figure 19D:
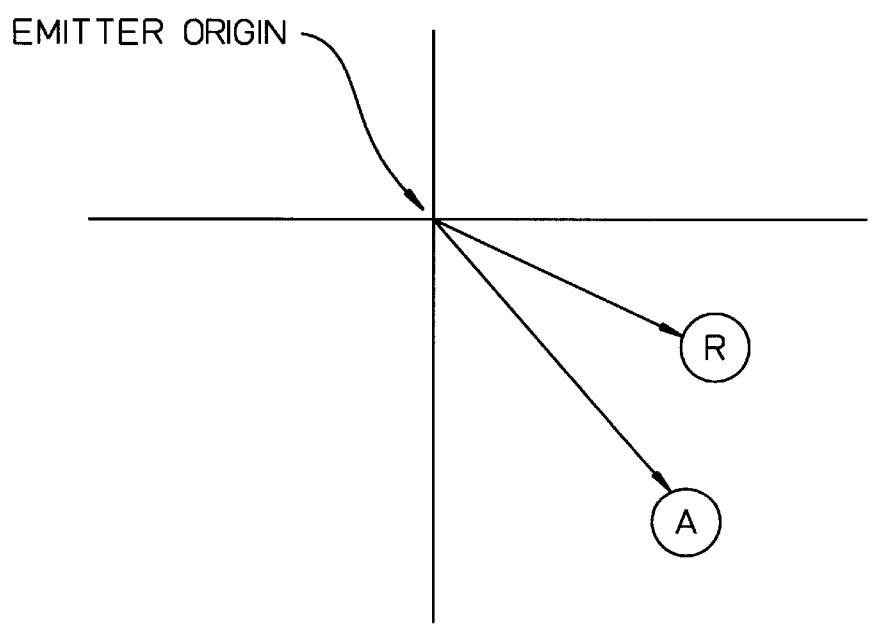

However, to obtain the true relationship between the emitters and detector, the detected positions of the detector relative to the emitters (FIG. 19C) are rotated about the origin (0,0) in the amount of $\theta_c$ as shown in FIG. 19D. Consequently, the true position of the detector relative to the emitters and the cant angle ($\theta_c$) are obtained. Recall, the cant angle ($\theta_c$) is the rotation of the detector from the sighted cant angle ($\theta_{c0}$).

Subsequent discussion will concentrate on the position of the detector relative to the reference emitter. The correction for the position relative to the auxiliary emitter is similar since the auxiliary emitter has a known offset from the reference emitter.

Cant causes a rotation of the point of impact by $\theta_c$ about $P_D$ on a radius R. The point $P_D$ is the detected point where the detector assembly 22 (attached to the shooting apparatus 14 and typically pointed in a slightly different direction than that of the shooting apparatus 14) is currently aimed as corrected for the cant $\theta_c$ as in FIG. 19D. The radius R is a function of values determined during system setup, as well as translations of the point of impact due to X and Y velocities of the shooting apparatus 14 at the moment the shot leaves the barrel and goes ballistic. The correction for cant is a $\Delta X_c$ and $\Delta Y_c$ pair of values. These values are not dependent on the point $P_D$ where the detector is currently aimed. Hence, the pair of values can be computed for rotation about any computationally convenient point and then the pair of values are applied to the actual detected point $P_D$.

Figure 20A:
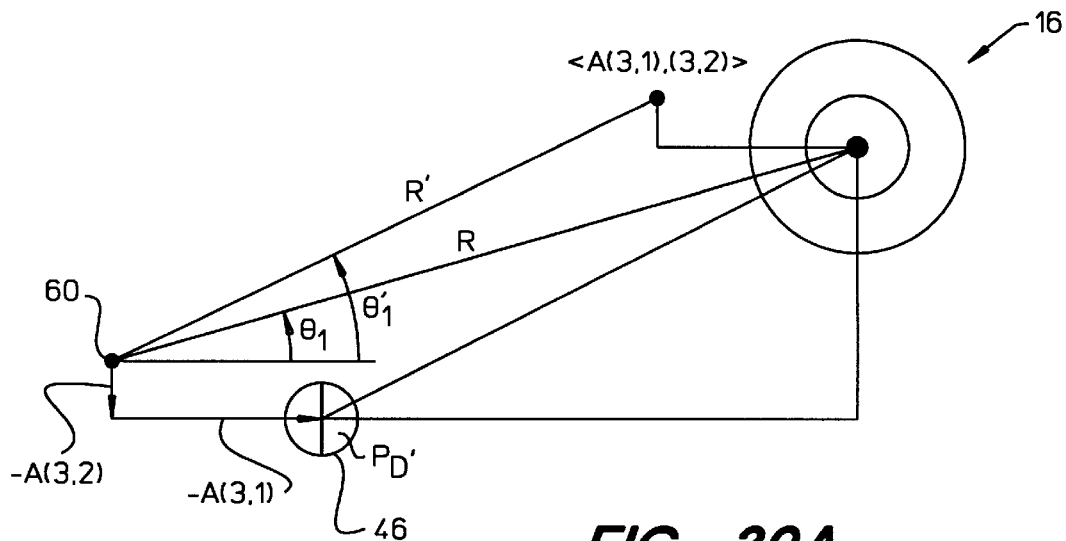
FIG. 20A is a diagram illustrating an example of a placement correction due to an offset of a detector point of aim relative to an emitter.

When the shooting apparatus 14 is held still with no cant ($\theta$=0) relative to sighted cant angle ($\theta_{c0}$) and aimed for perfect "10" on the target 16, the point of aim of the detector $P_D$' will likely have some offset from the emitter. This offset is determined during system setup and can be diagramed as illustrated in FIG. 20A. As shown in FIG. 20A, when the detector 46 is aimed at the emitter (assuming no cant angle and no velocity of the shooting apparatus 14), the shot will land at <A(3,1), A(3,2) >in target relative coordinates. The detector offsets <A(3,1), A(3,2)>are determined during system setup. Also, recall that the target relative coordinates are scaled, rotated and offset from the detector coordinates.

If the detector 46 (together with the shooting apparatus 14) are rotated about the emitter such that the detector 46 remains pointed at the emitter, the point of impact will swing on an arc about the emitter with constant radius R. An additional correction for ballistics was described above. The correction for rotation on radius R is computed for rotations relative to the uncanted line at $\theta_1$.

Figure 20B:
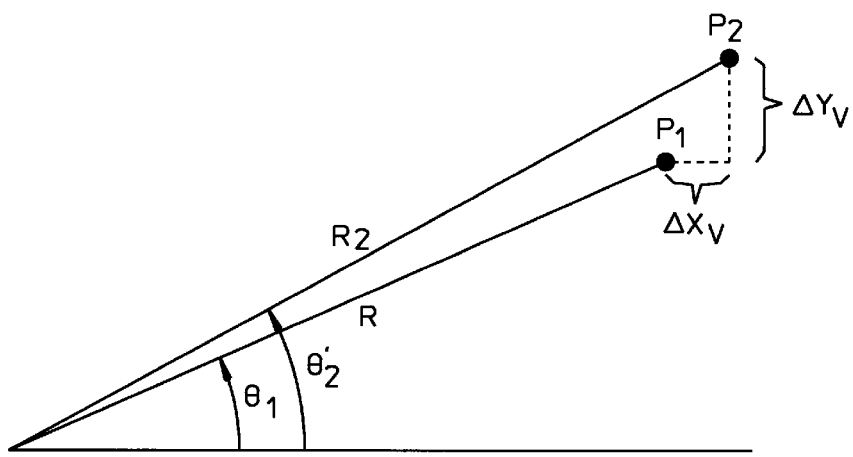
FIG. 20B is a diagram illustrating an example of a placement correction due to velocity at the moment of release.

Further, if there is a correction for the shot placement due to a velocity of the shooting apparatus 14 at the time the bullet went ballistic, the velocity will result in additional offsets to the radius R and the base angle $\theta_1$. These additional offsets should be used to adjust the radius R and $\theta_1$ prior to swinging about the detector point of aim. FIG. 20B is a diagram illustrating an example of the velocity correction. Radius R and base angle $\theta_1$ corresponding to the point of impact $P_1$ are corrected due to velocity at the moment of release. The velocity corrections to the point of impact due to velocity are denoted by $\Delta X_v$, $\Delta Y_v$, and the corrected point of impact is denoted $P_2$ with base angle $\theta_2$.

Figure 20C:
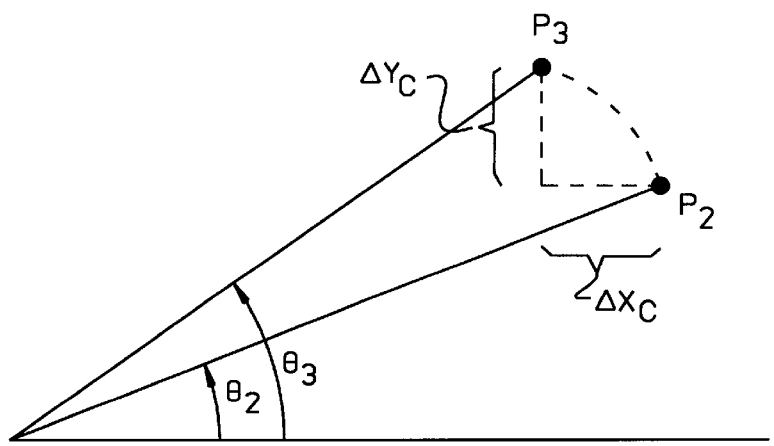
FIG. 20C is a diagram illustrating an example of a placement correction due to the cant angle.

In determining the fourth rotation (cant angle) ($\theta_c$), the corrected point of impact $P_2$ and base angle $\theta_2$ are used so that the velocity correction is invoked. Namely, as shown in FIG. 20C, the correction for cant (i.e., the fourth rotation) is an adjustment to the corrected point of impact $P_2$ in the amount of $\Delta X_c$, $\Delta Y_c$, and $\theta_c$. The resulting point of impact is then denoted by $P_3$ and $\theta_3$, where $\theta_3=\theta_2+\theta_c$.

Although the point of impact has now been determined and corrected for velocity and cant, several of the assumptions can be relaxed and replaced by further corrections.

The angle of the target $\theta_t$ was initially assumed to be vertical and therefor equal to zero degrees. If the target is at an angle other than zero degrees, the point of impact can be corrected by rotating the point of impact about the center of the target in the amount of the angle $\theta_t$.

The previous assumptions regarding the rotation ($\theta_e$) of the emitter from vertical and the rotation ($\theta_d$) of the detector from vertical can be relaxed. The sighted cant angle ($\theta_{c0}$), which was previously assumed to be 90°—straight upright—, can also vary during normal use. However, it is probably preferable to force $\theta_e$ and especially $\theta_t$ to be very close to zero degrees because this makes the data processing much more manageable. Deviations in $\theta_d$ and $\theta_e$ from vertical can be dealt with by measuring the detected rotation of the calibration shot. This detected angle, $\theta_{ref}$, is the angle reported when the system is held at $\theta_{c0}$. The system transform is then computed so that shots fired at this cant will result in a detected cant of 90°—straight upright—(e.g., $\theta_c=0°$), thereby compensating for deviations in $\theta_d$ and $\theta_e$.

The image appearing on the quad detector 46 is inverted by the lens 42 used within the detector assembly 22. Hence, if the emitter 6, 18 were to be moved up, its image appearing on the quad detector 46 would move down. Likewise, moving the emitter 6, 18 to the right would cause the image appearing on the quad detector 46 to move to the left.

Instead of moving the emitter and maintaining the detector stationary, it is preferable that the detector be moved and that the emitter be stationary. However, in either case, the movement of the emitter image on the surface of the quad detector 46 represents movement of either the emitter 6, 18 or the shooting apparatus 14.

It is also preferred that the image of the emitter appearing on the quad detector not be fully focused onto the surface of the quad detector 46. By slightly de-focusing the image, the spot size of the image becomes slightly larger so that the received energy lands on all four quadrants of the quad detector 46. In a preferred implementation of the shooting practice system, the emitter 18 is imaged onto the quad detector 46 of 2.5 millimeters by 2.5 millimeters as a one millimeter spot. For example, using the equation $$d=f(1-s/D) \tag{8}$$

where d is the distance from the optical center of the lens to the image, f is the focal length of the lens, D is the aperture of the lens, and s represents the spot size for the defocused image.

In the preferred implementation of the shooting practice, the coverage of this system is such that $\pm \Delta Y_{MAX}$ movement of the emitter causes the image spot to move slightly less than $\pm\frac{1}{2}$ millimeter on the detector 46. This is the range of motion which is available because it keeps energy in all four quadrants of the detector 46. The relationship between Y-direction motion of the emitter and the image spot motion is obtained from the following equation:

$$\Delta I = \Delta Y/d_1 * d_2 \tag{9}$$

where $d_1$ is the operating distance of the system (i.e., from emitter to detector lens), and $d_2$ is the distance from the detector lens to the active surface of the quad detector. A similar relationship exists for X-direction movement.

The detector assembly 22 senses the position of the emitter image on the surface of the quad detector 46. Thus, the position measured by the detector assembly 22 is the position of the emitter 18 relative to the point of aim of the detector assembly 22. However, what is desirable, at least in the shooting practice system, is the position of the detector assembly 22 (as well as the shooting apparatus 14) point of aim relative to the emitter 18. This, however, is simply obtained by inverting the sign of the emitter position relative to the point of aim of the detector which is measured by the detector assembly 22. Because the optical system itself causes a sign inversion, the detected coordinate values (u,v) from the detector 46 are used directly without a sign inversion.

In the preferred implementation, two emitters are used with the auxiliary emitter directly above the reference emitter as shown in FIG. 9A. The system detects the point of aim of the detector relative to the emitter. It should be noted that the position of the detector relative to the emitter changes as the active emitter alternates between the auxiliary emitter and the reference emitter. When the reference emitter is active, the detector is sensed at a first position relative to the emitter. Alternatively, when the auxiliary emitter is active, the detector is sensed at a second position relative to the emitter. In an aligned and uncanted system aimed above both emitters, the sensed detector point of aim would be higher above the reference emitter than the auxiliary emitter.

When the invention is implemented as a navigation aid for the blind, unlike the modulation patterns shown in FIGS. 9D and 9E, a single emitter modulation pattern might be generated by a serial data stream. Synchronization, in this case, would be obtained from the emitted data stream. The emitted data stream would also serve as a position beacon which could be located by pointing a detector in the direction of the emitter. The detector would provide the user with audio feedback indicating the accuracy of the user's aim. The serial data stream would also provide information about the type of beacon, namely labels such as "Restroom", "Stairs" and the like. The labels produced could be relayed to the user by computer generated speech or some other means. Here, a low power beacon could use a single emitter to produce widely spaced, single or double pulses separated by one-tenth of a second or more.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An aiming system comprising:
   a plurality of emitters for emitting distinguishable energy signals in a predetermined direction;
   an energy detector for receiving at least a portion of the energy signals produced by said emitters as detected energy; and
   a processing unit, operatively connected to said energy detector, for determining a point of aim of said detector with respect to at least one of said emitters based on the detected energy and for determining a rotation of said detector or emitters with respect to a reference orientation based on the detected energy, the rotation being about an axis between one of said emitters and a position of a corresponding image of the one of said emitters on said energy detector.

2. A system as recited in claim 1,
   wherein said energy detector is disposed apart from said emitters, and
   wherein said energy detector is pointed in the vicinity of said emitters.

3. A system as recited in claim 1, wherein the distinguishable energy signals are modulated infrared light signals.

4. A system as recited in claim 1,
   wherein the energy signals have a wavelength less than or equal to that of infrared, and
   wherein said system further comprises a filter disposed between said emitters and said energy detector for preventing at least a portion of energy not emitted by said emitters from reaching said energy detector.

5. A system as recited in claim 1,
   wherein the detected energy includes at least a plurality of sampled energy values for each of said emitters, and
   wherein said processing unit determines the rotation of said detector or emitters with respect the reference direction by
   using a first group of the sampled energy values associated with a first of said emitters and a second group of the sampled energy values associated with a second of said emitters;
   fitting a line or curve to the first group of the sampled energy values;
   determining displacements of one or more of the sampled energy values in the second group from corresponding expected positions on the line or curve; and
   determining an angle of rotation of said detector or emitters based on the displacements.

6. A system as recited in claim 5,
   wherein said fitting produces the curve using a line fit, and
   wherein the first group of the sampled energy values occur a small time interval prior to a predetermined event.

7. A system as recited in claim 1,
   wherein the distinguishable energy signals are produced by modulating said emitters differently and include a synchronization region and a least one sampling region, the synchronization region includes at least one pulse, and the at least one sampling region includes at least one pulse, the pulses being produced when at least one of said emitter is activated, and
   wherein said processing unit causes said detector to sample the modulated energy received at said detector during the sampling region.

8. A system as recited in claim 7, wherein the sampling by said detector includes obtaining a first sample of the modulated energy received by said detector by sampling the modulated energy during the pulse within the sampling region, and obtaining a second sample of the modulated energy received by said detector by sampling the modulated energy during the lack of the pulse within the sampling region.

9. A system as recited in claim 8, wherein the second sample is subtracted from the first sample to remove constant background noise from the first sample.

10. A system as recited in claim 1,
    wherein the energy signals have a wavelength less than or equal to that of infrared, and
    wherein said energy detector includes an energy sensitive surface for receiving at least a portion of the energy signals for each of said emitters, each of said emitters producing an imaged spot on the energy sensitive surface, and wherein the point of aim is determined based on the position of the imaged spot on said energy sensitive surface associated with at least one of said emitters.

11. A system as recited in claim 10, wherein the rotation of said energy detector or emitters is determined based on the position on said energy sensitive surface of the imaged spots associated with at least two of said emitters.

12. A system as recited in claim 10, wherein said processing unit comprises:

means for determining a first relative position of an imaged spot associated with one of said emitters on said energy sensitive surface; and means for transforming the first relative position to a second relative position, the second relative position indicating relative angular position of said energy detector with respect to the one of said emitters.

13. A system as recited in claim 1, wherein said system further comprises means for informing a user that the point of aim of said detector with respect to at least one of said emitters has been noticed.

* * * * *